United States Patent
Stumm et al.

(10) Patent No.: US 11,079,492 B1
(45) Date of Patent: Aug. 3, 2021

(54) CONDITION DEPENDENT PARAMETERS FOR LARGE-SCALE LOCALIZATION AND/OR MAPPING

(71) Applicant: Zoox, Inc., Foster City, CA (US)

(72) Inventors: Elena Stephanie Stumm, San Francisco, CA (US); Patrick Blaes, San Dimas, CA (US)

(73) Assignee: Zoox, Inc., Foster City, CA (US)

( * ) Notice: Subject to any disclaimer, the term of this patent is extended or adjusted under 35 U.S.C. 154(b) by 141 days.

(21) Appl. No.: 16/147,158

(22) Filed: Sep. 28, 2018

(51) Int. Cl.
*G01C 22/00* (2006.01)
*G05D 1/00* (2006.01)
*G01S 17/89* (2020.01)
*G01C 21/30* (2006.01)
*G05D 1/02* (2020.01)

(52) U.S. Cl.
CPC .............. *G01S 17/89* (2013.01); *G01C 21/30* (2013.01); *G05D 1/0088* (2013.01); *G05D 1/0231* (2013.01)

(58) Field of Classification Search
CPC ........ G01C 21/30; G01C 21/28; G01C 21/34; G05D 1/0088; G05D 1/0231; G05D 1/02; G05D 1/024; G05D 1/0238; G01S 17/89
USPC ......................................................... 701/28
See application file for complete search history.

(56) References Cited

U.S. PATENT DOCUMENTS

| | | | | |
|---|---|---|---|---|
| 9,870,624 | B1 * | 1/2018 | Narang | G06T 7/55 |
| 2010/0106356 | A1 * | 4/2010 | Trepagnier | G05D 1/0248 |
| | | | | 701/25 |
| 2012/0128204 | A1 * | 5/2012 | Aoba | G06K 9/6228 |
| | | | | 382/103 |
| 2016/0189004 | A1 * | 6/2016 | Anastassov | G06K 9/6215 |
| | | | | 382/113 |
| 2017/0255199 | A1 * | 9/2017 | Boehmke | G01S 7/4972 |
| 2019/0132572 | A1 * | 5/2019 | Shen | G01S 17/931 |
| 2019/0377358 | A1 * | 12/2019 | Zapolsky | G01S 17/86 |
| 2019/0384310 | A1 * | 12/2019 | Merfels | G01C 11/06 |
| 2020/0072620 | A1 * | 3/2020 | Gustafsson | G01S 19/49 |
| 2020/0073404 | A1 * | 3/2020 | Shi | G05D 1/0257 |
| 2020/0158517 | A1 * | 5/2020 | Tadi | G01C 21/32 |

OTHER PUBLICATIONS

IP.com Search Report.*
Google Search Report.*

* cited by examiner

*Primary Examiner* — Mahmoud S Ismail
(74) *Attorney, Agent, or Firm* — Lee & Hayes, P.C.

(57) ABSTRACT

A vehicle may include a localization and/or mapping component to understand what surrounds the autonomous vehicle and where it is in relation to the surroundings. The localization and/or mapping component may receive sensor data from sensor(s) of the vehicle and generate a map and/or position and/or orientation from the sensor data according to parameters that configure the way the localization and/or mapping component generates the map and/or position/orientation. A computing device may dynamically adjust these parameters, thereby changing the way the map and/or position/orientation are generated. This adjustment may be based on a condition detected from the sensor data and may increase a clarity (e.g., degree of distinctness/clarity) of the generated map and/or position/orientation.

20 Claims, 9 Drawing Sheets

MAP GENERATED USING STATIC PARAMETER(S) 400

MAP GENERATED USING ADJUSTED PARAMETER(S) 402

CONDITION DEPENDENT PARAMETERS FOR LARGE-SCALE LOCALIZATION AND/OR MAPPING

BACKGROUND

Autonomous vehicles rely on a variety of systems and methods for safely and efficiently navigating the world. In part, autonomous vehicles need to be aware of what is in their immediate surroundings and where they are within those immediate surroundings and/or greater contexts, like where they are within a city block, within a city, or within the world. Simultaneous localization and/or mapping (SLAM) algorithms attempt to simultaneously locate an agent within surroundings of the agent and map the surroundings of the agent. However, various conditions may reduce the accuracy of the resultant localization and/or map. This inaccuracy may impinge on the safe and efficient operation of the autonomous vehicle. For example, while a SLAM algorithm might produce a sufficiently accurate map while the autonomous vehicle is navigating through a city block, the SLAM algorithm might produce a poor map during highway navigation.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
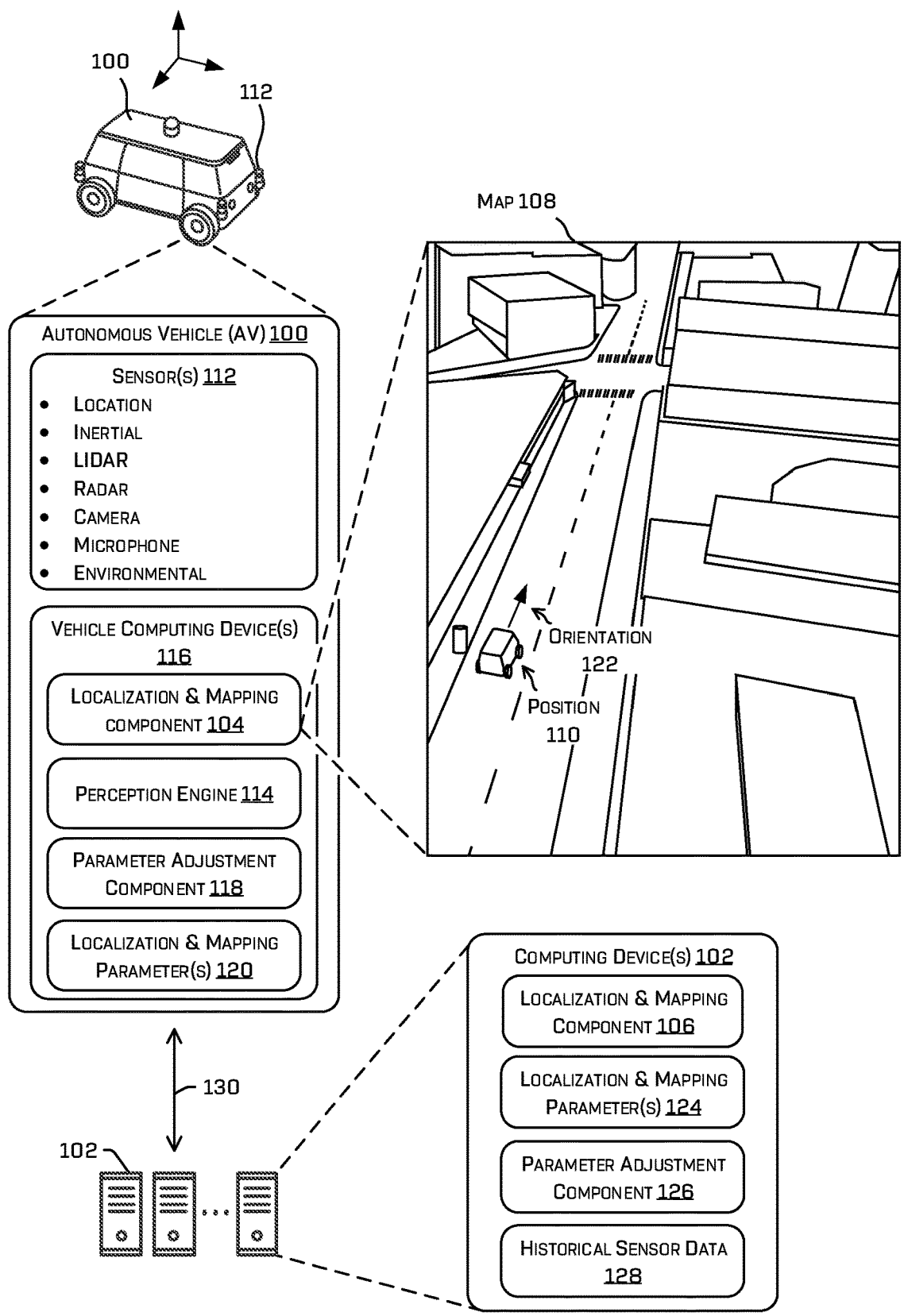
FIG. 1 illustrates an example autonomous vehicle and/or example computing device(s) that dynamically adjust a parameter of a localization and/or mapping component of the autonomous vehicle.

This disclosure is generally directed to techniques for accurately mapping an environment surrounding an agent, such as an autonomous vehicle, and/or localizing the agent within the environment/map.

In some instances, an autonomous vehicle may include a localization and/or mapping component to understand what surrounds the autonomous vehicle and where it is in relation to the surroundings. In some instances, a localization and/or mapping component may comprise hardware and/or software that determines a map of an environment through which the autonomous vehicle is navigating or has navigated and/or a position and/or orientation of the autonomous vehicle within that environment/map. To determine the map and/or position/orientation of the autonomous vehicle, the localization and/or mapping component may receive sensor data from sensor(s) of the autonomous vehicle. In some instances, the localization and/or mapping component may receive data from multiples sensors, whether from a single vehicle and/or multiple vehicles.

Parameter(s) configuring the localization and/or mapping component may determine how the localization and/or mapping component generates a map and/or position/orientation from the sensor data. For example, the parameters may include a type of localization and/or mapping component used, how much sensor data to accumulate before generating a map and/or position/orientation, a magnitude associated with an uncertainty variable included in a function of the localization and/or mapping component (e.g., a covariance), an identifier of sensor data to rely on and/or exclude from use, a sensor calibration value, a sensor function (e.g., a wavelength of a laser to transmit, a laser/RADAR pulse density, an ISO and/or zoom for taking an image), etc.

In some instances, historical sensor data may be available to the localization and/or mapping component. The localization and/or mapping component may additionally or alternatively rely on this historical sensor data when generating a map and/or position/orientation. In examples in which this historical sensor data is available to the localization and/or mapping component, the parameter(s) may additionally or alternatively include a search radius associated with a search for historical sensor data with which to perform a sensor data alignment and/or a frequency of attempted sensor data alignments within a distance traversed by the autonomous vehicle.

The techniques discussed herein may include dynamically adjusting parameter(s) of the localization and/or mapping component based on a condition at the autonomous vehicle. For example, this dynamic adjustment may include an autonomous vehicle that detects a condition and adjusts parameter(s) of the localization and/or mapping component to vary the way the localization and/or mapping component functions. In some instances, adjusting the parameter(s) may include performing a hyperparameter optimization and/or a lookup in condition/parameter pair table. For example, adjusting the parameter may include changing a sensor function, modifying sensor data provided as input to the localization and/or mapping component, changing a duration of time for which sensor data is accumulated before generating the map and/or position/orientation, changing a type of algorithm used, changing the magnitude of an uncertainty variable used by the localization and/or mapping component, etc.

The condition may include, for example, a classification of an environment surrounding the autonomous vehicle (e.g., city, highway, tunnel) and/or a characteristic of the sensor data (e.g., a speed, a location (e.g., determined by the localization and/or mapping component and/or a global positioning system (GPS) coordinates)), a quality of a particular sensor signal (e.g., a "strong" signal may have a signal-to-noise (SNR) ratio that meets or exceeds a threshold SNR ratio and/or a "weak" signal may have an SNR ratio that does not meet the threshold SNR), an indication of features in output of a sensor, a semantic label associated with the sensor data), and/or any other condition which may impact localization and/or mapping.

An indication of features in a sensor output may include an indication of how many features are detected as being present and/or a diversity of features in sensor data. For example, detecting features in output of a sensor may comprise determining a number of edges, projecting sensor data into a voxel space (e.g., projecting LIDAR points of a point cloud into voxels of a voxel space), determining a depth discontinuity, detecting a corner, determining a surface normal associated with a voxel, determining a distribution of points in a voxel (e.g., determining a planarity of the points in voxel), etc. These determinations may indicate a measure of how varied the features are surrounding an autonomous vehicle. For example, an autonomous vehicle may determine that less features are present in sensor data captured while driving through a tunnel than driving in a downtown area of a city.

In some instances, computing device(s), which may include a device of the autonomous vehicle and/or a service that communicates with one or more autonomous vehicles of a fleet of vehicles, may receive sensor data from an autonomous vehicle (e.g., either directly from an autonomous vehicle and/or from a database of historical sensor data). The computing device(s) may use a localization and/or mapping component to generate a map and/or position/orientation based at least in part on the sensor data and may score the map and/or position/orientation. In some instances, the score may be based at least in part on a clarity (e.g., a degree of distinctness/"crispness" or, inversely, a degree of "blur") of the map. Determining the score may include projecting sensor data into a voxel space, determining a residual of points in a voxel, and/or determining a planarity of points in a voxel. For example, U.S. application Ser. Nos. 15/674,853 and 15/675,487 filed on Aug. 11, 2017 may discuss various methods for determining the clarity of a map and/or a score that indicates the blurriness of the map. U.S. application Ser. Nos. 15/674,853 and 15/675,487 filed on Aug. 11, 2017 are incorporated herein by reference. In some instances, determining the score may comprise projecting sensor data into a voxel cell, determining an occupancy of a voxel space associated with a point cloud generated from an output of the sensor, determining a residual associated with the voxel space, determining an indication of planarity of points in the voxel cell, and/or determining a measure of distortion of an element of the map.

In some instances, the computing device(s) may determine whether the score meets or exceeds a score threshold (e.g., by being lower than the score threshold where the threshold is a minimum threshold). If the score does not meet the score threshold, the computing device(s) may adjust parameter(s) of the localization and/or mapping component such that the clarity of the map and/or position/orientation is increased and/or upon re-scoring a map and/or position/orientation generated using the adjusted parameter(s), the score is decreased (e.g., where the score indicates a blurriness). If the score meets the score threshold, the computing device(s) may still seek to increase the clarity and/or decrease the score. Once adjustments to the parameter(s) have been finalized (e.g., the score meets or exceeds the score threshold) and/or if the score meets or exceeds the score threshold, the parameter(s) may be associated with a condition (e.g., a classification of the environment and/or a characteristic of the sensor data). In some instances, the computing device(s) may transmit the condition/parameter pair to an autonomous vehicle.

In some instances, an autonomous vehicle may adjust parameter(s) of the localization and/or mapping component by changing the parameter(s) in a manner that increases the clarity of the map and/or position/orientation. In some instances, adjusting parameter(s) of the localization and/or mapping component may comprise performing a hyperparameter optimization to determine adjusted parameters, by looking up condition value(s) in a condition-parameter pair table, and/or by interpolating parameter value(s) between condition values or extrapolating parameter value(s) outside condition values. The hyperparameter optimization may improve the clarity of the resultant map and/or position/orientation without finding the optimal set of parameters although, in some instances, the hyperparameter optimization may find the optimal set of parameters. In other words, the adjusted parameter(s) may improve the clarity of the map and/or position/orientation without being the best permutation of adjusted parameter(s) possible (e.g., without being a global minimum or even a local minimum across the parameter space evaluated according to an objective function that seeks to minimize the score). Although, it is contemplated that the hyperparameter optimization may result in the optimal parameter(s). Once the autonomous vehicle has determined the adjusted parameter(s), the autonomous vehicle may operate the localization and/or mapping component according to the adjusted parameters.

To give an example, an autonomous vehicle may include a LIDAR sensor that accumulates data points into a point cloud.

The techniques described herein may improve the accuracy of the map and/or position/orientation output by a localization and/or mapping component, which thereby improves the safety and efficacy of autonomous vehicles using the localization and/or mapping component. For example, the techniques may improve the clarity of the map and/or position/orientation, which may allow the autonomous vehicle to generate trajectories for controlling the autonomous vehicle that appropriately navigate past object(s) in the environment and/or to correctly classify object(s) in the environment. In at least some examples, the techniques presented herein may provide for a sufficient level of detail so as to resolve objects in the environment which would otherwise have been undetected. By resolving such objects, an autonomous vehicle, for example, can more safely traverse the environment. Moreover, the techniques described herein may enable an autonomous vehicle to generate a map and/or localize its position/orientation more easily, thereby reducing a computation load on the autonomous vehicle's processor(s) (e.g., central processing unit(s), graphics processing unit(s)). This may also speed up the localization, thereby enabling the autonomous vehicle to react to situations it encounters more quickly. Efficacy of the autonomous vehicle may refer to the ability of the autonomous vehicle to successfully navigate in an environment and/or to do so in the most efficient manner.

EXAMPLE

FIG. 1 illustrates an example autonomous vehicle 100 and/or example computing device(s) 102 that dynamically adjust a parameter of a localization and/or mapping component 104/106 to improve a map 108 and/or position/orientation 110 determined by the localization and/or mapping component 104/106.

In some instances, the autonomous vehicle 100 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 100 may be a fully or partially autonomous vehicle having any other level or classification now in existence or developed in the future. Moreover, in some instances, the condition-dependent localization and/or mapping parameter adjustment techniques described herein may be usable by non-autonomous vehicles as well.

According to the techniques discussed herein, the autonomous vehicle 100 may receive sensor data from sensor(s) 112 of the autonomous vehicle 100. For example, the sensor data may include a location signal (e.g., a GPS signal), an inertia signal (e.g., an accelerometer signal, a gyroscope signal, etc.), a magnetometer signal, wheel encoders, speedometers, a point cloud of accumulated LIDAR and/or RADAR points, an image (or images), an audio signal, and/or bariatric or other environmental signals, etc. In some instances, a perception engine 114 running on computing device(s) 116 of the autonomous vehicle 100 may detect object(s) from the sensor data and/or classify an environment through which the autonomous vehicle 100 is or has navigated. For example, the classification may include "city," "highway," "tunnel," "rain," "fog," etc. In some instances, the perception engine 114 may include one or more machine learning (ML) models and/or other computer-executable instructions for detecting, identifying, segmenting, classifying, and/or tracking objects from sensor data collected from the environment of the autonomous vehicle 100. Moreover, the perception engine 114 may associate at least some of this information with sensor data that is provided to the localization and/or mapping component 104. For example, the perception engine 114 may associate a semantic label with specific portions of sensor data, e.g., associating an object name (e.g., "pedestrian," "drivable surface," "traffic signal," "tree") with point(s) of a point cloud, voxel(s) of a voxel grid, and/or pixel(s) of an image, associating a sound name (e.g., "speech," "waves") with a portion of an audio signal, etc. Data from such sensor(s) 112 may also be used to determine one or more of velocities, accelerations, orientations, etc.

In some instances, the perception engine 114 may receive sensor data from one or more sensors 112 of the autonomous vehicle 100, determine perception data from the sensor data, and transmit the perception data to a localization and/or mapping component 104 and/or parameter adjustment component 118. In additional or alternate instances, the localization and/or mapping component 104 may receive the sensor data from one or more sensors 112 of the autonomous vehicle 100. In some instances, this perception data may include a condition of the operating regime of the autonomous vehicle 100. This condition may include a classification of the environment and/or a characteristic of the sensor data (e.g., a speed of the vehicle, a location of the vehicle (e.g., global coordinates), a quality of a particular sensor signal (e.g., GPS signal is "strong," having low uncertainties, etc.), an indication of an amount of features in an output of a sensor, a semantic label associated with the sensor data). In an additional or alternate instance, the localization and/or mapping component 104 may provide the map 108 and/or position/orientation 110 to the perception engine 114 (e.g., for the perception engine to detect objects/classify the environment). In some instances, the indication of features may include a number of semantic labels generated, a number of edges present in sensor data, a number of corners, a number of uniquely detected objects, etc (e.g. any other unique or interesting pieces of data with respect to a remainder of the data). The autonomous vehicle may use this indication to determine a score and/or as one of the lookup values in association with a permutation of parameters, as discussed in more detail below. For example, in an environment that includes a greater amount of features, the more detail the autonomous vehicle 100 may expect from a map.

In some instances, the localization and/or mapping component 104 may receive at least some of the sensor data (e.g., LIDAR data, RADAR data, image data) and the parameter adjustment component 118 may receive the condition. In additional or alternate instances, the localization and/or mapping component 104 may additionally receive the condition and the parameter adjustment component 118 may receive additionally receive the sensor data.

The localization and/or mapping component 104 may be configured to generate a map 108 and/or a position/orientation 110 based at least in part on the sensor data, in accordance with parameter(s) 120. For example, the parameters may include a type of localization and/or mapping algorithm used, how much sensor data to accumulate before generating a map and/or position/orientation (e.g., a duration of time to accumulate sensor data and/or an instruction to a sensor to capture data at a specified rate), a spin rate (e.g., a spin speed associated with a spinning LIDAR platform), a firing rate (e.g., a firing frequency of transmitters of a LIDAR sensor), a magnitude of an uncertainty variable included in a function of a localization and/or mapping algorithm, an identifier of sensor data to rely on and/or exclude from use, a sensor calibration value (any one or more of extrinsics or intrinsics of a sensor), a sensor function (e.g., a wavelength of a laser to transmit, a laser/RADAR pulse density, an ISO and/or zoom for taking an image), etc. In some instances, the localization and/or mapping component 104 may continuously generate a map 108 and/or position/orientation 110 as it receives sensor data (and/or as it accumulates enough sensor data, e.g., every 10 milliseconds, every second, etc., depending on the rate of sensor data capture).

In some instances, the map 108 generated by the localization and/or mapping component 104 may include a topological map, an occupancy grid, a point map, a landmark map, a mesh, a graph of pose constraints, and/or any other suitable map. The position/orientation 110 may comprise a relative position/orientation in relation to point(s) and/or object(s) in the map 108, a local coordinate, and/or a global coordinate (e.g., a GPS coordinate). In additional or alternate instances, the position/orientation 110 may additionally include an orientation 122 (e.g., yaw, roll, pitch). Together the position/orientation 110 and orientation 122 may describe a "pose."

The parameter adjustment component 118 may receive the condition and/or sensor data and may adjust parameter(s) 120 that control how the localization and/or mapping component 104 generates a map 108 and/or position/orientation 110.

The parameter adjustment component 118 may receive the condition (comprising a classification and/or a characteristic of the sensor data) and may determine to adjust parameter(s) 120 based at least in part on the classification and/or characteristic. To give a simplistic example, based on receiving an indication that a GPS signal is weak and that the classification of the environment indicates that the autonomous vehicle 100 is operating in a tunnel, the parameter adjustment component 118 may adjust parameters of the localization and/or mapping component 104 by increasing the magnitude of a covariance variable used in the localization and/or mapping component 104. In this example, the parameter adjustment component 118 may additionally or alternatively increase a speed at which a LIDAR device is revolving and/or increase a duration of time that the localization and/or mapping component 104 waits for sensor data to accumulate before generating the map 108 and/or the position/orientation 110.

In some instances, the parameter adjustment component 118 may determine how much to vary a parameter based on a hyperparameter optimization where an objective function of the optimization is based on the clarity of a resultant map (e.g., this may include iteratively varying one or more parameters, generating a map, scoring the map (e.g., to determine an amount of blurriness and/or clarity, as discussed in U.S. application Ser. Nos. 15/674,853 and 15/675,487, which are incorporated herein by reference), determining whether the varied parameters decreased the score over a map generated using former parameters, and so on, where a decreased score indicates an increase in clarity). In some instances, the hyperparameter optimization may comprise a grid search, random search, Bayesian optimization, and/or gradient-based optimization.

In additional or alternate instances, the parameter adjustment component 118 may comprise a table of condition-parameter pairs (e.g., a key-value hash table) and the parameter adjustment component 118 may look up a condition received from the perception engine 114 to find a matching or near-matching condition in the table. In some instances, the parameter adjustment component 118 may interpolate and/or extrapolate a parameter from one or more near-matching entries in the table. For example, if a condition received from the perception engine 114 specifies a classification, "city," and a characteristic, "23 mph," and the parameter adjustment component 118 conducts a lookup for these parameters and finds two entries that respectively specify "city" "15 mph" and "city" "30 mph," the parameter adjustment component 118 may use parameters associated with the entries to interpolate and/or extrapolate new parameter(s) to use as the adjusted parameter(s). In additional or alternate instances, the parameter adjustment component 118 may conduct a lookup based at least in part on a classification, a characteristic of sensor data, and/or sensor data itself.

In some instances, computing device(s) 102 may determine the table of condition-parameter pairs. The computing device(s) 102 may comprise the vehicle computing device(s) 116 and/or device(s) of a service, such as a vehicle fleet management service. The computing device(s) 102 may comprise a localization and/or mapping component 106, localization and/or mapping parameter(s) 124, and a parameter adjustment component 126 that may be similar to elements 104, 120, and 118, respectively and/or may be a test version that has not yet been rolled out to a fleet of vehicles. The computing device(s) 102 may also store historical sensor data 128 received from one or more autonomous vehicles via a network 130. Note that, although historical sensor data 128 is depicted at the computing device 102, the historical sensor data 128 is received from one or more autonomous vehicles, therefore autonomous vehicle 100 may comprise at least some historical sensor data 128 and/or may, in some examples, receive historical sensor data from other autonomous vehicle(s).

The computing device(s) 102 may receive sensor data (e.g., directly from an autonomous vehicle over the network, directly from a sensor when the computing device(s) 102 include vehicle computing device(s) 116, and/or from the stored historical sensor data 128) and determine sensor data with which to perform a sensor data alignment. Determining sensor data with which to perform a sensor data alignment may include searching through the sensor data for sensor data that is associated with similar locations, poses, and/or trajectories of the vehicle. For example, it is more likely that two sets of sensor data (perhaps captured by different vehicles or the same vehicle at two different times) corresponds to a same portion of an environment when a GPS signal, pose, and/or trajectory associated with two sets of sensor data is similar.

In some instances, to identify a "similar" set of data, the computing device(s) 102 may receive a first set of sensor data associated with a first location (e.g., first coordinates output by the localization and/or mapping component, first coordinates of a GPS signal) and may perform a search for sensor data (e.g., within the historical sensor data 128) associated with a second location that is within a radius of the first location. Similarly, the computing device(s) 102 may additionally or alternatively determine historical sensor data that is associated with a pose that is similar to a first pose, such as by determining whether the pose is within a basin of attraction to the first pose, within a threshold number of degrees, etc. and/or that a trajectory is within a basin of attraction, threshold angle, etc. and/or velocity of a trajectory associated with the sensor data. In some instances, the radius, threshold number of degrees, and/or threshold angle and velocity may be part of the parameter(s) 120 and/or 124 used by the localization and/or mapping component 106 to generate a map and/or position/orientation. In instances where the computing device(s) 102 identifies two sets of sensor data to use, the localization and/or mapping component 106 may combine the sensor data to generate the map 108 and/or position/orientation 110.

Once the localization and/or mapping component 106 has received sensor data, whether combined sensor data or a single set of sensor data, the localization and/or mapping component 106 may generate a map 108 and/or a position/orientation 110. In some instances, the parameter adjustment component 126 may perform hyperparameter optimization to adjust the parameter(s) 124 for data having a same or similar classification and/or sensor data characteristic until a map generated by the adjusted parameters meets or exceeds a threshold score (e.g., which may include determining that the score is below a score threshold, where a lower score indicates decreased blurriness/increased clarity). In some instances, the parameter adjustment component 126 may adjust the parameter(s) 124, cause the localization and/or mapping component 106 to re-generate the map and/or position/orientation, the parameter adjustment component 126 may score the map and/or position/orientation, and the parameter adjustment component 126 may determine whether the adjustment improved the score compared to previous permutations of parameter(s).

In some instances, the score may include an indication of a degree of clarity of the map and/or position/orientation generated by the localization and/or mapping component 106. Determining the score may include projecting sensor data into a voxel space, determining a residual of points in a voxel, and/or determining a planarity of points in a voxel.

The parameter adjustment component 126 may associate a condition (e.g., a classification and/or a sensor data characteristic) with a set of adjusted parameters once the parameter adjustment component 126 (1) has determined that a permutation of parameter(s) 124 results in a map generated by the localization and/or mapping component 106 that equals or exceeds a score threshold, (2) has performed cross-validation across historical sensor data 128 associated with a same or similar condition, and/or (3) the hyperparameter optimization determines that a permutation of parameter(s) 124 is associated with a local minimum or global minimum (or minimum loss) of an objective function evaluated over the parameter(s) 124 (e.g., the objective function may be based on a score of the map). In some instances, the parameter adjustment component 126 may associate a condition with adjusted parameters in a table so that the table includes a plurality of condition-parameter pairs (e.g., an entry in the table may include the follow simplified pair: condition: "city" and "30 mph," adjusted parameters: "10 milliseconds" and covariance of 0.23).

In some instances, the computing device(s) 102 may transmit condition-parameter pair(s) via the network 130 to the autonomous vehicle 100 so that the autonomous vehicle 100 may adjust the parameter(s) 120 of the localization and/or mapping component 104, as discussed above.

Example Scenario

Figure 2:
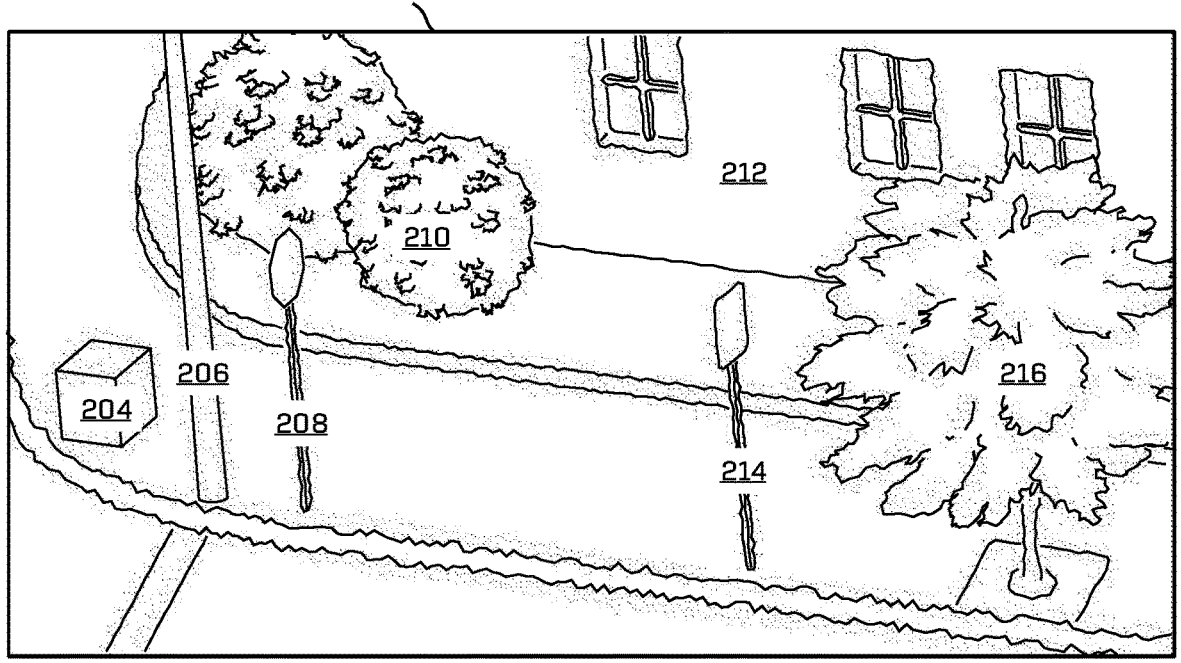
FIG. 2 illustrates a block diagram of an example environment in which an example autonomous vehicle may perform localization and/or mapping and an example map generated by a localization and/or mapping component.
Figure 2:
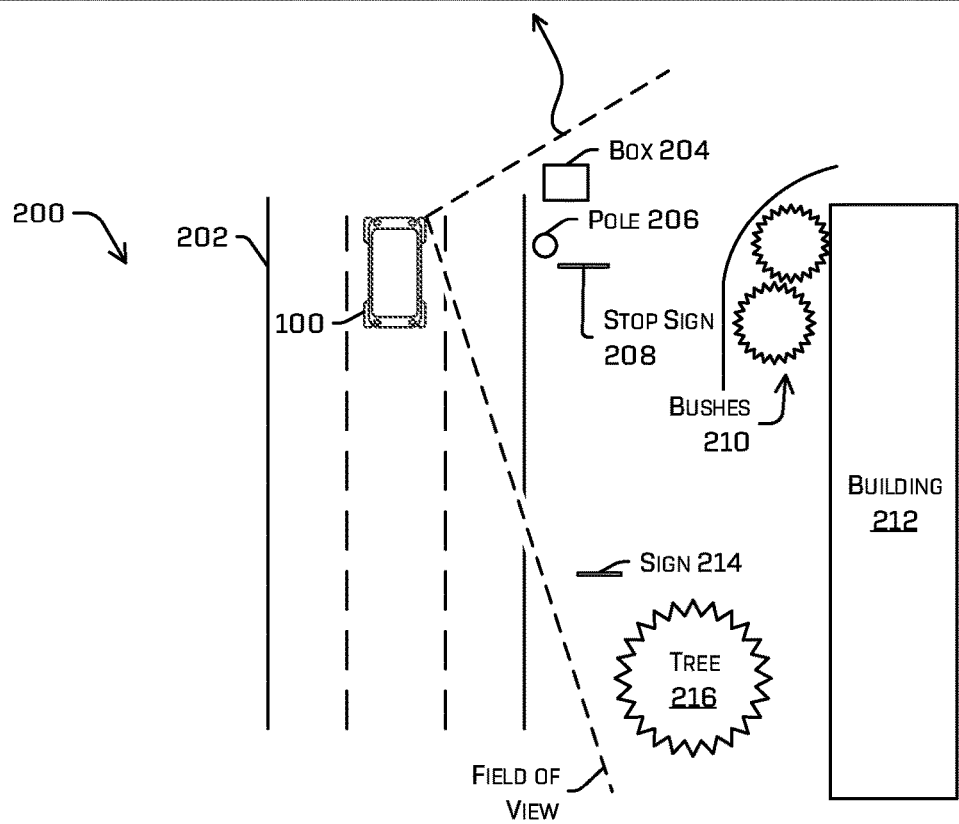

FIG. 2 illustrates an aerial view of an example scenario 200 that illustrates one instance of many for which techniques discussed herein may be applied. In the example scenario, an autonomous vehicle 102 is operating in a city environment that includes a roadway 202, a box 204, a pole 206, a stop sign 208, bushes 210, a building 212, a sign 214, and a tree 216. FIG. 2 also includes a representation of a map 220 generated by a localization and/or mapping component using unadjusted (static) parameter(s). Note that map 220 may fail to represent all the elements of the environment (e.g., portions of the ground, sidewalk, or distant object may not appear in the map) and the representation of the map 220 represents blurriness/lack of clarity using jagged lines and dispersed dots. The map 220 includes sensor data representing the roadway 202, the box 204, the pole 206, the stop sign 208, the bushes 210, the building 212, the sign 214, and the tree 216.

Example Process

Figure 3A:
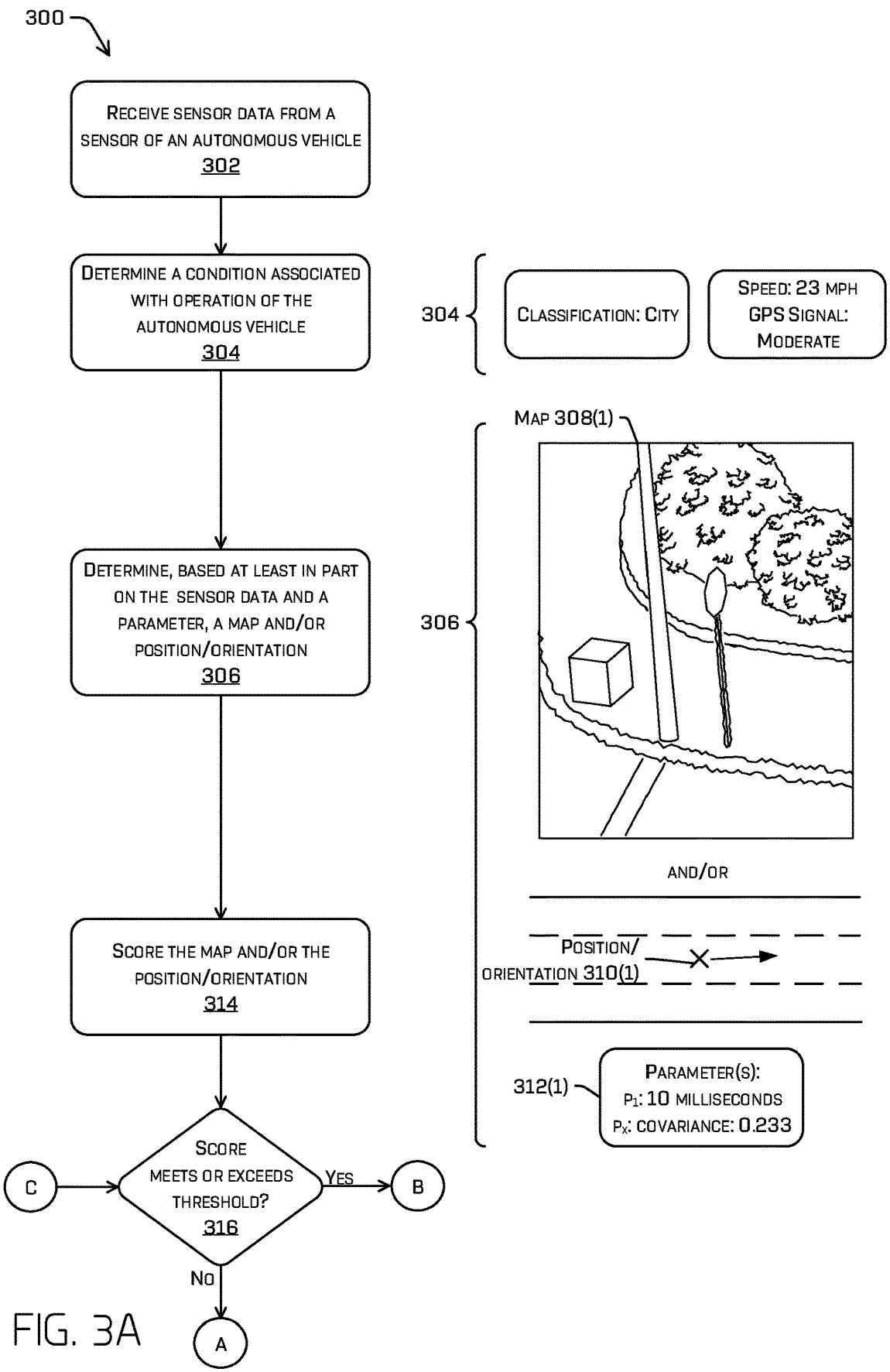
FIGS. 3A-3C illustrate a pictorial flow diagram of an example process for adjusting parameter(s) of a localization and/or mapping component to improve the clarity of maps and/or positions generated by the localization and/or mapping component.
Figure 3B:
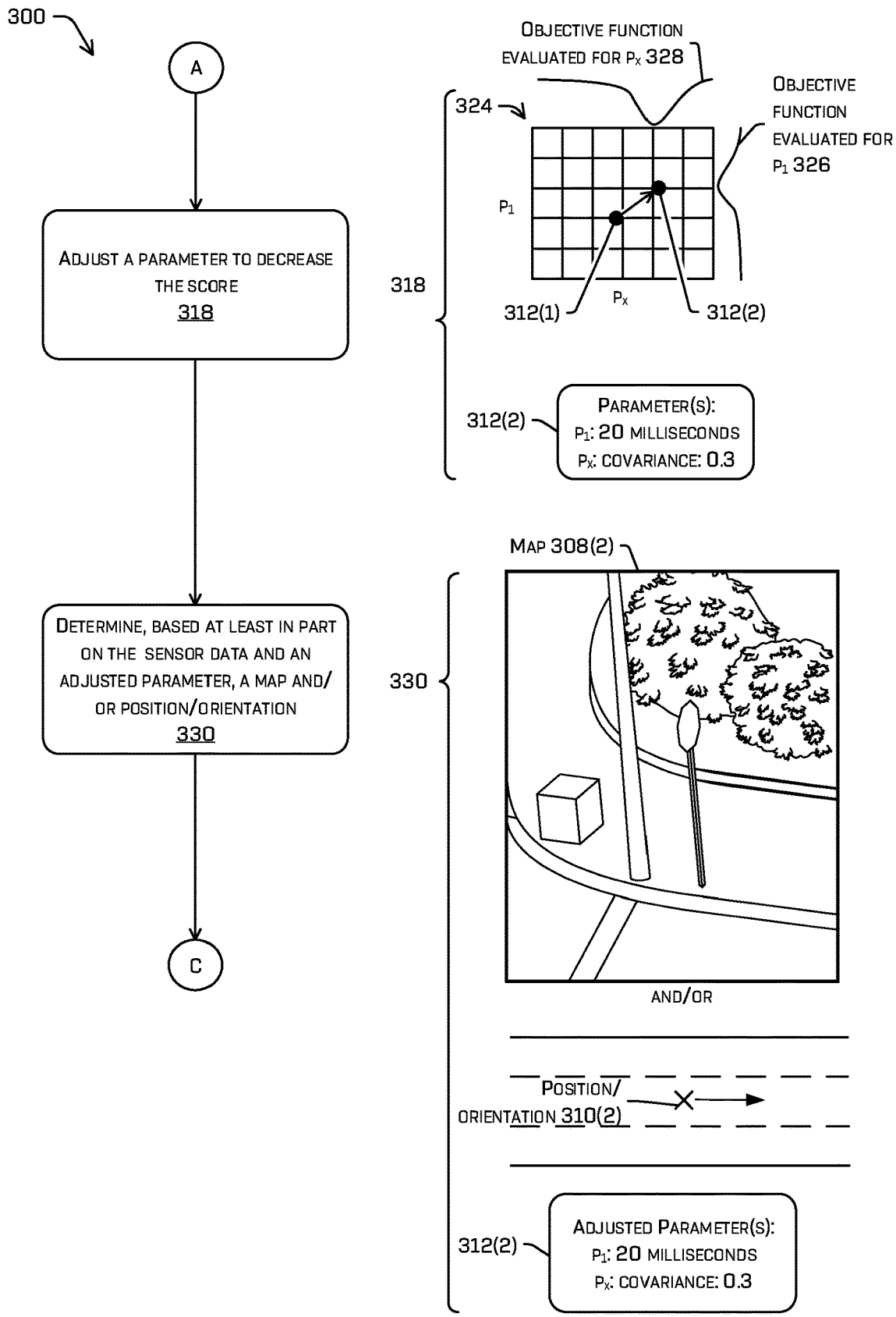
Figure 3C:
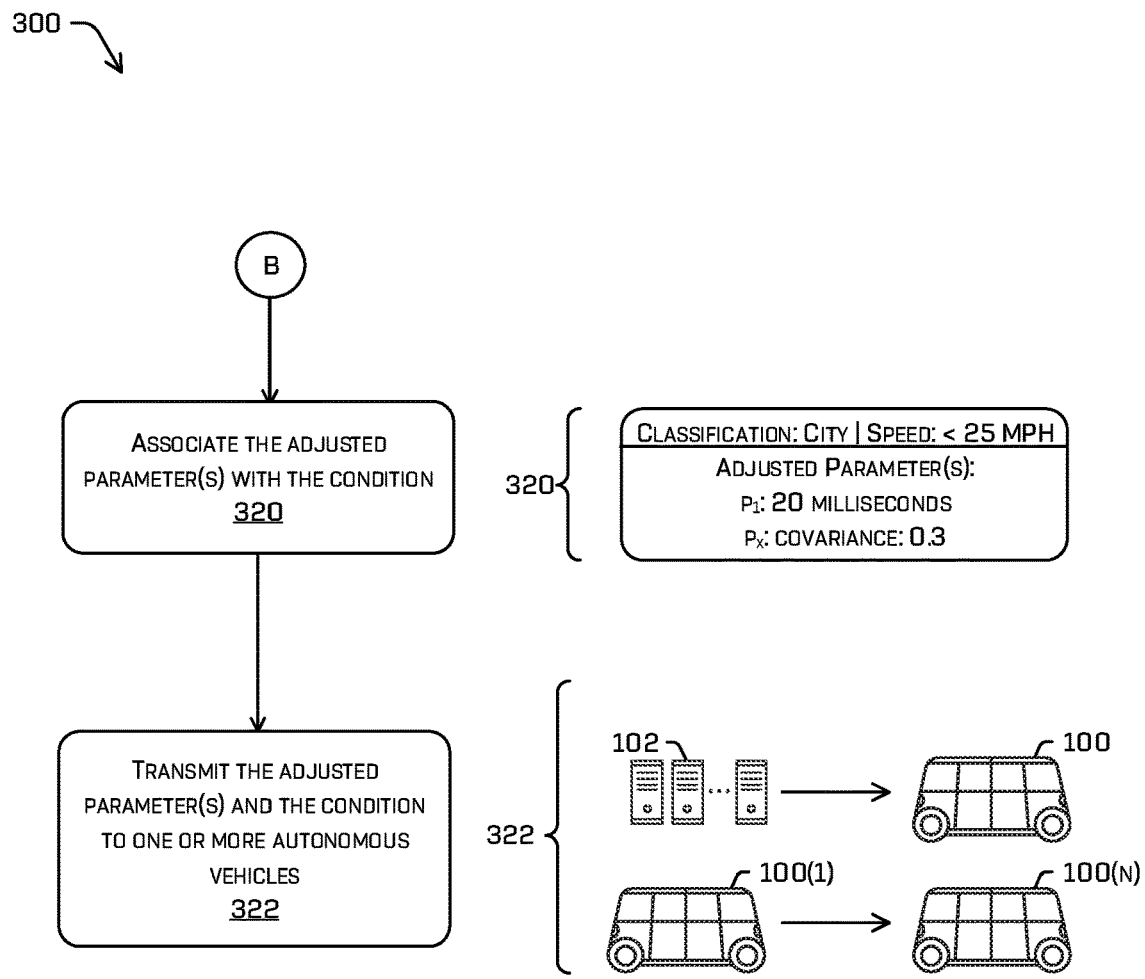

FIGS. 3A-3C illustrate a pictorial flow diagram of an example process 300 for adjusting parameter(s) of a localization and/or mapping component to improve the clarity of a map and/or position/orientation generated by the localization and/or mapping component. Example process 300 may be performed by computing device(s) such as computing device(s) 102 and/or vehicle computing device(s) 116. In some instances, example process 300 may be conducted to train a lookup table, state machine, etc. for use by a vehicle.

At operation 302, example process 300 may include receiving sensor data from a sensor of an autonomous vehicle, according to any of the techniques discussed herein. For example, this may include receiving the sensor data directly from a sensor on-vehicle, receiving the sensor data from the sensor over a network, and/or retrieving historical sensor data stored in a memory. In instances where example process 300 is part of a training process to generate a lookup table, state machine, etc., the training should include sensor data that corresponds with a variety of conditions (e.g., rainy city, sunny city, snowy city, rainy suburbs, sunny suburbs, city at 50 miles per hour, city at 25 miles per hour, etc.). Receiving the sensor data at operation 302 may comprise identifying, from a set of available sensor data associated with disparate locations, sensor data that corresponds to a same location (e.g., as discussed regarding FIGS. 6A & 6B). For example, a large repository of sensor data may be available to a computing device and the sensor data may correspond to sensor data taken as vehicles operated through an entire city or country. Therefore, in some instances, a preliminary step may comprise identifying sensor data that corresponds to a same location.

At operation 304, example process 300 may include determining a condition associated with the sensor data, according to any of the techniques discussed herein. Operation 304 may comprise classifying an environment (e.g., classification: "city" in the illustrated example) through which the autonomous vehicle is or was operating and/or identifying salient characteristics of the sensor data for the localization and/or mapping component and/or the parameter adjustment component (e.g., a speed of 23 miles per hour (MPH), an indication of a GPS signal quality being "moderate" in the illustrated example). Salient characteristics of the sensor data may include types of sensor data used as input by the localization and/or mapping component and/or the parameter adjustment component. Operation 304 may include additional operations to determine characteristics from sensor data in addition to or alternatively from the literal data that the sensor data indicates. For example, the localization and/or mapping component may output coordinates and/or a GPS signal may indicate coordinates, which may be a characteristic, but operation 304 may additionally or alternatively include determining an abstraction of the data such as the quality of the signal (e.g., the SNR indicates a "weak" signal or a "strong" signal), a variance of the coordinates indicated over time (e.g., the coordinates move around erratically, e.g., coordinates indicated over time vary by a distance that exceeds a threshold distance and/or a speed of the autonomous indicated by a velocity signal received from a drive train sensor), etc.

In some instances, operation 304 may include determining to provide different ones of the classification and/or the characteristics to the parameter adjustment component and/or the localization and/or mapping component. For example, the parameter adjustment component may be configured to receive a classification and characteristics that include a speed of the autonomous vehicle, a trajectory determined by the autonomous vehicle, a location signal, a variance and/or quality of the location signal, a score associated with a previously generated map and/or position/orientation (which may be an indication of the clarity of the map and/or position/orientation), etc., and output adjusted parameters based at least in part on the classification and/or characteristics. Whereas, the localization and/or mapping component may be configured to receive the adjusted parameters and characteristic(s) such as LIDAR data, RADAR data, image data, etc. and output a map and/or position/orientation, according to the adjusted parameters and based at least in part on the characteristics. In an additional or alternate scenario, the localization and/or mapping component may also receive the classification and/or the same characteristics received by the parameter adjustment component.

At operation 306, example process 300 may include determining a map 308(1) and/or position/orientation 310(1) based at least in part on the sensor data, according to any of the techniques discussed herein. In some instances, operation 306 may proceed operation 304. For example, the localization and/or mapping component may generate a map and/or position/orientation and provide the map and/or position/orientation to a perception engine for the perception engine to generate a classification. In some instances, the localization and/or mapping component may determine a map and/or position/orientation based at least in part on the sensor data and the parameters that control how the localization and/or mapping component functions.

Taking just a single parameter as an example, the localization and/or mapping component may receive a stream of LIDAR points and may store and/or otherwise accumulate the LIDAR points until an accumulation time period (e.g., 10 milliseconds, 20 milliseconds, 1 second) is met. The localization and/or mapping component may thereby be configured to generate a map using the LIDAR points accumulated in the last 10 milliseconds. That accumulation period may be a parameter. For example, in a city environment where the vehicle is moving rather slowly, a 10 millisecond accumulation period may capture most or all of the features of an environment, whereas at a higher speed the 10 millisecond accumulation period may not be long enough to capture a representation of salient objects in the environment.

To give another example, when the localization and/or mapping component generates the map, the localization and/or mapping component may perform a calculation that includes a covariance. This covariance may be a parameter that may be adjusted. In general, the parameters may vary the sensor data used by the localization and/or mapping component (e.g., modifying sensor behavior such as by increasing a spin rate of a LIDAR transmitter/receiver, increasing a point cloud density, changing a zoom/ISO of a camera, modifying the sensor data after it is received such as by changing a sample rate, changing an amount of sensor data used, smoothing and/or normalizing the data, changing an assumed sensor pose) and/or may vary a function of the localization and/or mapping component itself (e.g., changing a sensor data accumulation time, adjusting the covariance used in a calculation by the localization and/or mapping component). FIG. 3 illustrates example parameter(s) $312(1)$ $p_1$, a sensor data accumulation time period of 10 milliseconds, and $p_x$, a covariance of 0.233. Although FIG. 3 depicts two parameters, any number of parameters are contemplated.

At operation 314, example process 300 may include scoring the map and/or the position/orientation, according to any of the techniques discussed herein. In some instances, the score may indicate a degree of clarity (or, inversely, a degree of "blur") of the map and/or position/orientation.

At operation 316, example process 300 may include determining whether the score meets or exceeds a threshold score, according to any of the techniques discussed herein. If the score does not meet the threshold score, example process 300 may continue to operation 318. If the score meets or exceeds the threshold score, example process 300 may continue to operation 320 and/or 322. In instances where a low score indicates low blurriness and high clarity, meeting or exceeding the threshold score may include determining that the score is below the threshold score. It is contemplated that this may be inverted for a score that indicates low clarity with a low score.

At operation 318, example process 300 may include adjusting parameter(s) to decrease the score, according to any of the techniques discussed herein. For example, adjusting the parameter(s) may comprise performing a hyperparameter optimization (e.g., grid search, random search, Bayesian optimization, gradient-based optimization) over the parameter(s) to minimize the score (e.g., an objective function may be configured to calculate the score that would result from a map generated using the permutation of parameters at a point in the grid for a grid search). For example, FIG. 3 illustrates a representation of a grid search 324 that results in increasing the values of two parameters, $p_1$ and $p_x$, from parameters $312(1)$ (i.e., 10 milliseconds and 0.233, respectively) to parameter $312(2)$ (i.e., 20 milliseconds and 0.3, respectively) because this results in a decreased score (represented by the "dips" in the object functions 326 and 328). The grid search 324 also includes a representation 326 of an objective function evaluated for variations of $p_1$, while other parameter(s) are held constant, and a representation 328 of an objective function evaluated for variations of $p_1$, while other parameter(s) are held constant. In some instances, the objective function may reflect a score of a map and/or position/orientation that would result from a permutation of parameters. The adjusted parameters (i.e., $312(2)$) correspond minima of the object functions, which may be found according to the hyperparameter optimization.

In some instances, the permutation of adjusted parameters may define a state of the vehicle system. For example, a first permutation may control the vehicle to accumulate sensor data for a first defined period, the localization and/or mapping component may generate a map using a first covariance, an identification of sensor data to use and/or discard, etc.—this may cumulatively be referred to as a state of the vehicle (i.e., the vehicle is operating according to the first state, which includes the sensor data accumulation period, covariance, etc.).

At operation 330, example process 300 may include determining a map $308(2)$ and/or a position/orientation $310(2)$ based at least in part on the adjusted parameter and sensor data, according to any of the techniques discussed herein. In some instances, the sensor data may include new sensor data. For example, where the localization and/or mapping component may use the 10 milliseconds of sensor data used to generate map $308(1)$ and/or position/orientation $310(1)$ and a new next 10 milliseconds of sensor data (i.e., to fulfill the requirement imposed by the adjusted parameter, $p_1$, to accumulate 20 milliseconds of sensor data before generating a map and/or position/orientation). In an additional or alternate example, the map $308(2)$ and/or position/orientation $310(2)$ may be based on completely different sensor data (e.g., sensor data collected in the 20 milliseconds following the 10 milliseconds upon which the map $308(1)$ and/or position/orientation $310(2)$ were based).

In instances where example process 300 is performed by an autonomous vehicle, the map $308(2)$ and/or position/orientation $310(2)$ may be generated according to the latter example where the operation 330 is based on new sensor data. In an additional or alternate instance, where an adjusted parameter specifies a change to sensor behavior, additional or alternate sensor data may be captured before performing operation 330. Whereas, in instances where example process 300 is performed by a computing device of a computing system, the former technique may be used where the map $308(2)$ and/or position/orientation $310(2)$ may be re-generated from the sensor data received at operation 304 (with new data added thereto when an adjusted parameter requires new data to be added such as when a parameter specifies a longer sensor data accumulation period and/or an increased sensor data collection density). It is contemplated that the reverse may be true for either the autonomous vehicle or computing device of a computing system.

Maps $308(1)$ and map $308(2)$ are representations of actual maps generated by a localization and/or mapping component. Note the increased clarity (or reduced "blur") in map $308(2)$ compared to map $308(1)$. These representations are reproduced in full in FIGS. 4A & 4B for increased ease of comparison. After generating determining the map $308(2)$ and/or position/orientation $310(2)$, example process 300 may return to operation 314 and/or operation 316 and/or continue to operations 320 and/or 322.

At operation 320, example process 300 may include associating the adjusted parameter(s) (e.g., 312(2)) with the condition (e.g., the condition determined at operation 304), according to any of the techniques discussed herein. For example, this may include associating a classification and/or a characteristic of the sensor data with the adjusted parameter(s) (e.g., 312(2)). In some instances, operation 320 may include storing the condition and adjusted parameters as an entry in a lookup table such as a key-value hash table where the condition may be the key and the adjusted parameters may be the value associated with the key. This condition-parameter table may thereby cumulatively store adjusted parameters for different conditions that an autonomous vehicle may encounter.

In some instances, before associating the adjusted parameter(s) with the condition, the example process 300 may perform cross-validation of the adjusted parameter(s) using historical sensor data that is associated with a same classification and/or similar characteristic to ensure that the score for maps and/or position/orientations generated from the historical sensor data using the adjusted parameter(s) continues to result in maps and/or position/orientations associated with scores that meet or exceed the score threshold (and/or that meet or exceed the score threshold for a threshold percentage of the maps and/or position/orientations generated using the adjusted parameters).

At operation 322, example process 300 may include transmitting the adjusted parameter(s) and the condition to one or more autonomous vehicles, according to any of the techniques discussed herein. In instances where example process 300 is performed by computing device(s) 102, the computing device(s) 102 may transmit a condition-parameter pair entry insertion/deletion/replacement command and/or an entire condition-parameter pair table to a first autonomous vehicle 100(1). In some instances, the autonomous vehicle 100(1) may transmit any of these instructions or portions of the condition-parameter pair table to an n-th autonomous vehicle 100(N). In instances where example process 300 is performed by the autonomous vehicle 100(1), the autonomous vehicle 100(1) may transmit a condition-parameter pair entry insertion/deletion/replacement command and/or an entire condition-parameter pair table to an n-th autonomous vehicle 100(N).

In additional or alternate instances, at operation 322, a computing device 102 may make the associated parameter(s) and condition available for retrieval (e.g., via a cloud service, via a server). In additional or alternate instances, device characteristics may additionally be associated with the parameter(s) and condition. For example, a model, year, version number, etc. may be further associated with the parameter(s) and condition. In some instances, a computing device 102 may use these device characteristics to determine a subset of vehicles to which to transmit the parameter(s) and condition and/or to limit availability of the parameter(s) and condition to that subset.

Example Maps

Figure 4A:
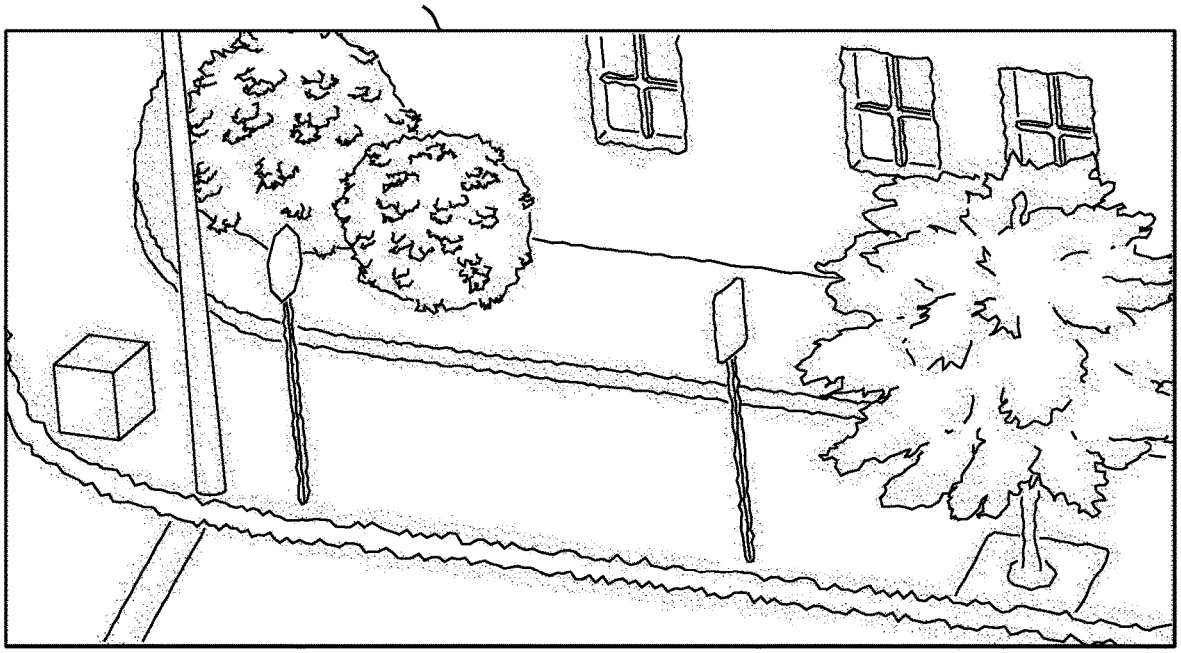
FIGS. 4A & 4B illustrate examples of maps generated by a localization and/or mapping component.
Figure 4B:

FIGS. 4A & 4B illustrate examples of maps generated by a localization and/or mapping component. FIG. 4A illustrates a representation of a map 400 generated using first parameters. In some instances, the first parameters may be default parameters, previously determined parameters (e.g., previously adjusted parameters for condition(s) that existed at the vehicle in the past), and/or static parameters. Map 220 includes the same representation, but includes element identifiers. FIG. 4B illustrates a representation of a map 402 generated using the same sensor data as used to generate map 400, but the localization and/or mapping component used an adjusted covariance in comparison to a first covariance used to generate map 400. Note that the clarity of map 402 is greater than the clarity map 400. This increased clarity may result in increased accuracy in perceiving where objects are in the environment, what the objects are in the environment, and/or where the autonomous vehicle is in the environment, which individually and collectively improve the safety and efficacy of operation of the autonomous vehicle.

Example Process

Figure 5:
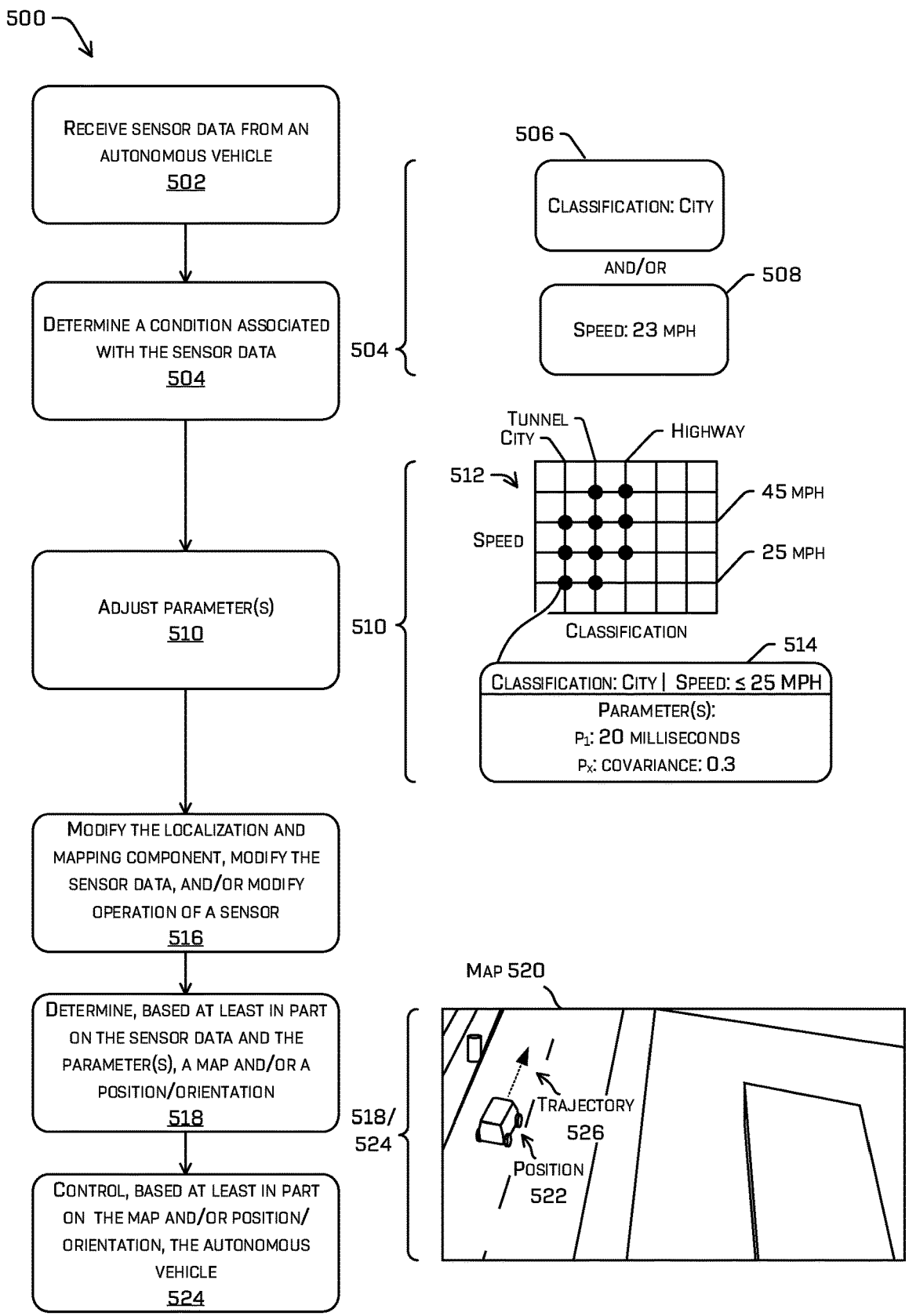
FIG. 5 illustrates a pictorial flow diagram of an example process for adjusting parameter(s) of a localization and/or mapping component to improve the clarity of a map and/or position/orientation generated by a localization and/or mapping component.

FIG. 5 illustrates a pictorial flow diagram of an example process 500 for adjusting parameter(s) of a localization and/or mapping component to improve the clarity of a map and/or position/orientation generated by the localization and/or mapping component. Example process 500 may be performed when multiple permutations of parameters are available. For example, a first permutation of parameter(s) may be associated with a first condition in a condition-parameter pair table. Example process 300 may be performed by computing device(s) such as computing device(s) 102 and/or vehicle computing device(s) 116.

At operation 502, example process 500 may include receiving sensor data from a sensor of an autonomous vehicle, according to any of the techniques discussed herein.

At operation 504, example process 500 may include determining a condition associated with the sensor data, according to any of the techniques discussed herein. The condition may include a classification 506 and/or a characteristic 508. For simplicity, only one classification 506 (e.g., city) and only one characteristic 508 (e.g., speed: 23 MPH) are depicted, although numerous permutations of classifications and/or characteristic(s) are possible such as, for example and without limitation, "bridge," "suburb," "construction zone," "tunnel," "rural area," "highway," "speed unlimited," "rainy," "foggy," "slippery," "icy," "snow," "natural disaster," "fire," etc.

At operation 510, example process 500 may include adjusting parameter(s) associated with a localization and/or mapping component, according to any of the techniques discussed herein. For example, the parameter(s) may control how the localization and/or mapping component generates a map and/or position/orientation (e.g., by modifying sensor data and/or perception data supplied to the localization and/or mapping component and/or by modifying operations made by the localization and/or mapping component). In some instances, operation 510 may include a hyperparameter optimization over the existing parameters to increase and/or maximize a clarity of a map and/or position/orientation generated by the localization and/or mapping component.

In some instances where a hyperparameter optimization has already occurred and/or a plurality of condition-parameter pairs are already available (e.g., where a computing device has already determined condition-parameter pairs, where an autonomous vehicle stores a condition-parameter pair table), operation 510 may include determining one or more condition entries that match, or are similar to, the condition determined at operation 510. In some instances, the vehicle may conduct a lookup based at least in part on at least one of a velocity of the vehicle, a classification of the environment, an estimated location of the vehicle (e.g., determined by the localization and/or mapping component, received from a GPS), etc.

For example, FIG. 5 includes a representation of a condition space 512 where vertices of the graph occupied by a dot indicate a condition that has a permutation of parameters associated with it and where unoccupied vertices represent a condition that has not yet had a permutation of parameters associated with it. For example, entry 514 may be a condition-parameter pair where the condition specified by the condition-parameter pair includes a classification indicating "city" and a characteristic indicating a speed less than or equal to 25 miles per hour.

In some instances, where a condition determined at operation 504 does not exactly match a condition in a condition-parameter table, operation 510 may include determining nearest condition(s) in the table. In some instances, this may include determining a distance (e.g., Euclidian) of the condition determined at operation 504 to nearest condition(s) in a condition-space. If the distance to a nearest condition in condition space meets or exceeds an upper distance threshold, operation 510 may include conducting a hyperparameter optimization. The results of this hyperparameter optimization may be used to enter a new condition-parameter pair in the lookup table. If the distance to a nearest condition in condition space does not meet the upper distance threshold, but meets or exceeds a lower distance threshold, the operation 510 may comprise extrapolating and/or interpolating parameters, as the adjusted parameter(s), from the parameters associated with the nearest condition(s). If the distance to a nearest condition does not meet the lower distance threshold, the operation 510 may comprise using the permutation of parameters specified by the nearest condition as the adjusted parameter(s). In at least some examples, operation 510 may comprise performing an interpolation (linear, cubic, parabolic, etc.) between multiple values. In at least other examples, operation 510 may simply select the "closest" match. For example, "city" may be associated with a speed and an indication of features in the environment (e.g., a range of number of edges detected) and the autonomous vehicle may be at a visitor center of a national park. Although the vehicle may not generate a "city" classification, the vehicle may determine that the characteristics associated with "city" are the closest classification and may therefore choose to operate using the "city" classification.

In some instances, operation 510 may enforce an exact match for the classification and/or may use the upper and/or lower distance threshold for a characteristic of the sensor data. For example, operation 510 may conduct a search for nearest conditions in a "city" plane of the condition-space and, to use speeds as an example of characteristic upper and lower distances thresholds, the upper distance threshold may be 10 miles per hour and the lower distance threshold may be 5 miles per hour. Other thresholds are contemplated for speed and for any of the characteristics discussed herein.

In the illustrated example, the classification determined at operation 504 identically matches the classification associated with entry 514 and the characteristic determined at operation 504 may be determined to not meet the lower distance threshold (e.g., the difference between 23 miles per hour and 25 miles per hour is less than the 5 miles per hour lower distance threshold discussed above). Therefore, in the illustrated example, operation 510 may result in an adjustment component controlling a localization and/or mapping component according to the parameter(s) specified by entry 514.

At operation 516, example process 500 may include modifying operation of the localization and/or mapping component, modifying the sensor data, and/or modifying operation of a sensor, based at least in part on the adjusted parameter(s) determined at operation 510 and according to any of the techniques discussed herein. For example, depending on the parameter that was modified, a function of the localization and/or mapping component may be changed (e.g., a different algorithm may be used, a different type of map may be output, a covariance used in generating the map and/or position/orientation may be change), more sensor data may need to be accumulated, discarding sensor data (e.g., visual data is less useful in a tunnel), etc.

At operation 518, example process 500 may include determining a map 520 and/or position/orientation 522, based at least in part on the sensor data and the adjusted parameter(s), according to any of the techniques discussed herein. Depending on the parameters modified at operation 510, the sensor data may be newly acquired and/or modified.

At operation 524, example process 500 may include controlling an autonomous vehicle based at least in part on the map 520 and/or the position/orientation 522, according to any of the techniques discussed herein. In some instances, a planner of the autonomous vehicle may use perception data, including the map 520 and/or the position/orientation 522, to generate a trajectory 526 for controlling motion of the autonomous vehicle 100. For example, the planner may determine a route for the autonomous vehicle from a first location to a second location, generate, substantially simultaneously, a plurality of potential trajectories for controlling motion of the autonomous vehicle in accordance with a receding horizon technique (e.g., 1 micro-second, half a second) to control the vehicle to traverse the route, and select one of the potential trajectories as a trajectory of the autonomous vehicle that may be used to generate a drive control signal that may be transmitted to drive components of the autonomous vehicle.

Example Parameter

Figure 6A:
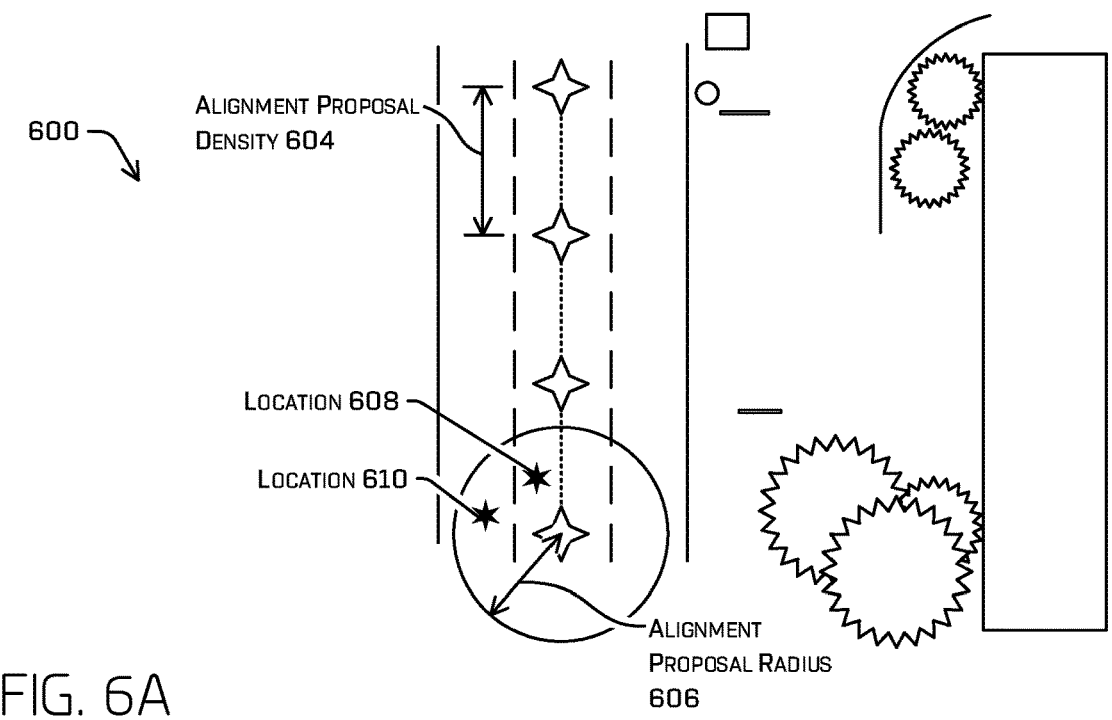
FIGS. 6A & 6B illustrate additional or alternate parameters that may be adjusted when generating a map and/or position/orientation.
Figure 6B:
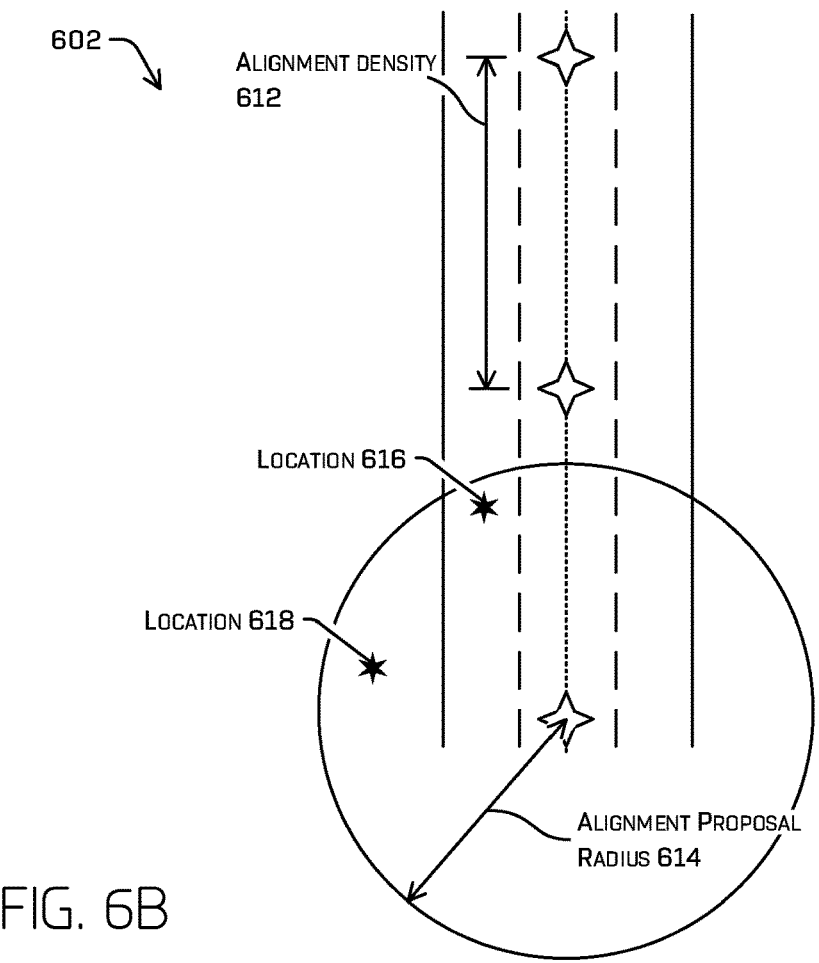

FIGS. 6A & 6B illustrate additional or alternate parameters that may be adjusted when generating a map and/or position/orientation. FIGS. 6A & 6B illustrate example environments 600 and 602 and parameters for identifying sensor data to combine to create combined data, from which a map and/or position/orientation may be generated.

FIG. 6A illustrates an aerial representation of an example environment 600 of sensor data captured in example scenario 200. This sensor data may be associated with a condition that includes a classification of "city." In some instances, sensor data that is accumulated may need to be aligned before it is useful. Moreover, more than one sensor may capture data that corresponds to a same portion of an environment and/or, when the computing device performing the techniques discussed herein has access to historical sensor data, there may be sensor data recorded by a different vehicle or recorded by the same vehicle at a different time that may be used to further improve a map generated for a particular portion of an environment. In some instances, sensor data alignment may include projecting sensor data into a voxel space.

In some instances, a localization and/or mapping component may be controlled by a parameter that specifies a density 604 of alignment proposals. For example, the density 604 may include a number of proposed sensor data alignments within a distance. To give a specific, but non-limiting example, this may include determining whether sensor data is available from which to generate a map every 5 meters, 10 meters, 20 meters, etc. FIG. 6 depicts, as a four-sided star, locations in the environment that correspond to the density 604 of alignment proposals. For example, FIG. 6A may depict a density 604 of 5 meters, whereas FIG. 6B may depict a density 612 of 20 meters. In some instances, a computing device may conduct a search at each of the four-sided stars for sensor data that corresponds to the location of the four-sided star.

A proposal may include an attempt to project sensor data into a voxel space and/or a determination of whether the resultant combined sensor data meets or exceeds a low score threshold. For example, this low score threshold may be much lower than the score threshold discussed above because it may be merely designed to ensure that the sensor data that was combined was suitable to combined (e.g., there were no major obstructions present in the sensor data, no other errata in the sensor data caused a major issue). In other words, not every proposal may work well to generate a map. An alignment proposal may include identifying sensor data associated with coordinates that are within a radius 606 of the proposal location, generating a map from the identified sensor data, scoring the generated map to see if the map is clear (e.g., determining if the score meets or exceeds a threshold score and keeping the map, if it does meet or exceed the threshold score), adjusting the parameters to increase clarity of the map if necessary (e.g., if the score does not meet or exceed the threshold score), and either keeping the resultant map if the clarity can be improved or discarding the resultant map if the parameter adjustment couldn't improve the clarity of the map (e.g., no tested permutation of the parameters resulted in increasing the clarity of the map). For example, clarity may not be able to be improved due to aberrant sensor data such as outlier data, a semi-truck that is reflected in some, but not all, of the identified sensor data (e.g., the semi-truck may have passed a first vehicle that captured sensor data that was used, but sensor data from a second vehicle doesn't reflect the semi-truck—this discrepancy may result in a map that has a large amount of distortion because of attempting to align the sensor data that corresponds to the space occupied by the semi-truck). In some examples, the alignment density may be increased where a condition indicates that there is an elevated amount of features present in the environment, such as in a city, or decreased, as in FIG. 6B.

In some instances, a localization and/or mapping component may be controlled by a parameter that specifies an alignment proposal radius 606. The localization and/or mapping component may conduct a search for sensor data associated with a location and/or pose that is similar to a first set of sensor data (e.g., within a distance of a point specified by the alignment proposal density 604). For example, location 608(1) may be a first location indicated by a location signal in a first set of sensor data. In some instances, the alignment proposal radius 606 may be measured from the location signal corresponding to location 608(1), although in additional or alternate instances the radius may be otherwise calculated such as depicted in FIG. 6A. In the illustrated example, a search for sensor data associated with a location within the alignment proposal radius 606 may return sensor data associated with location 610.

FIG. 6B shows an alternate example environment 602, which may include a tunnel, to illustrate how these parameters may be adjusted. In some examples, the alignment density 612 may be decreased in comparison to alignment density 604, based at least in part on detecting a higher speed of the autonomous vehicle, a classification that the environment is a tunnel (or otherwise has less information (a number of sensor features, GPS signals, etc.) than other areas), an indication that the sensor data includes less features, etc. Additionally or alternatively, the alignment proposal radius 614 may be increased (compared to alignment proposal radius 606), based at least in part on determining that a quality of a location signal does not meet a threshold (e.g., the SNR does not meet an SNR threshold) and/or that a covariance of the location indicated by the location signal meets or exceeds a variance threshold (e.g., the location identified by the location signal jumps all over rapidly). For example, locations 616 and 618 may both be within the alignment proposal radius 614 and may be associated with sets of sensor data that may be used by the localization and/or mapping component, even though location 618 indicates a location outside the roadway, which may be reasonable in a tunnel that may obstruct satellite communications.

However, in some instances, a constraint may be enforced to limit how large the parameter adjustment component may adjust the radius because, in some cases, such a search in an overly-large radius may return sensor data for a different environment. For example, where two tunnels lay parallel to each other (or follow a substantially similar curve), the tunnels may be so featureless and/or similarly featured that the low proposal threshold is not sufficient to reject the sensor data associated with the different tunnel. Any of the parameters discussed herein may have an upper and/or lower constraint to prevent the parameter adjustment component from adjusting a parameter past the upper constraint or adjusting the parameter below the lower constraint. In some examples, the upper and/or lower constraint may be machine-learned based at least in part on training a model based at least in part on a set of hard examples. An upper and/or lower constraint may be associated with a parameter and/or a condition (e.g., a first upper constraint may be associated with an alignment proposal radius and a classification, tunnel; but a different upper constraint may be associated with an alignment proposal radius and a classification, highway).

In some instances, once sensor data has been identified that corresponds to any of the search parameters discussed herein, the set(s) of sensor data identified according to the search parameter(s) may be combined (e.g., aligned, projected into a same voxel space), and the localization and/or mapping component may generate a map and/or position/orientation based at least in part on the combined sensor data.

Example Architecture

Figure 7:
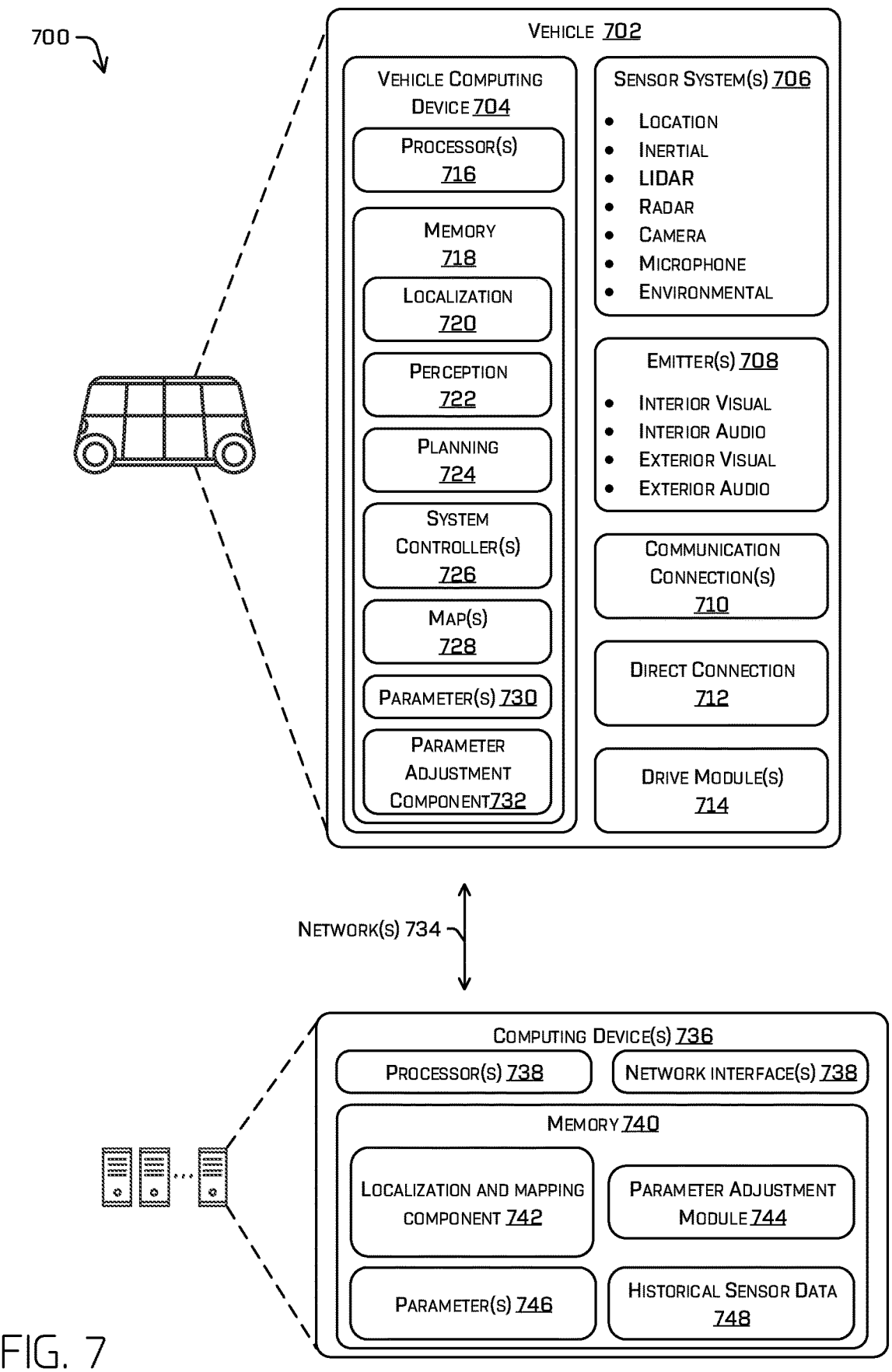
FIG. 7 illustrates a block diagram of an example system for dynamically adjusting a parameter of a localization and/or mapping component.

FIG. 7 depicts a block diagram of an example system 700 for implementing the techniques described herein. In some instances, the system 700 may include a vehicle 702, which may correspond to the autonomous vehicle 100 in FIG. 1.

The vehicle 702 may include a vehicle computing device 704, one or more sensor systems 706, one or more emitters 708, one or more communication connections 710, at least one direct connection 712, and/or one or more drive modules 714.

The vehicle computing device 704 may include one or more processors 716 and memory 718 communicatively coupled with the one or more processors 716. In the illustrated example, the vehicle 702 is an autonomous vehicle; however, the vehicle 702 may be any other type of vehicle, or any other system having at least an image capture device (e.g., a camera enabled smartphone). In the illustrated example, the memory 718 of the vehicle computing device 704 stores a localization component 720 (which may represent localization and/or mapping component 104 and/or 106 of FIG. 1), a perception component 722 (which may represent perception engine 114 of FIG. 1), a planning component 724, one or more system controllers 726, one or more maps 728, parameter(s) 730 (which may represent localization and/or mapping parameter(s) 120 and/or 124 of FIG. 1), and/or parameter adjustment component 732 (which may represent parameter adjustment component 118 and/or 126) stored thereon that, when executed by the one or more processors 716 may cause the vehicle 702 and/or the vehicle computing device 704 to perform various actions discussed herein. Though depicted in FIG. 7 as residing in memory 718 for illustrative purposes, it is contemplated that the localization component 720, the perception component 722, the planning component 724, the one or more system controllers 726, the one or more maps 728, the augmented reality component 730, and the image recognition component 732 may additionally, or alternatively, be accessible to the vehicle 702 (e.g., stored remotely).

In some instances, the localization component 720 may include functionality to receive data from the sensor system(s) 706 to determine a map and/or position/orientation of the vehicle 702. For example, the localization component 720 may include and/or request/receive a map of an environment and may continuously determine a location of the autonomous vehicle within the map. In some instances, the localization component 720 may utilize simultaneous localization and/or mapping (SLAM) and/or calibration, localization and/or mapping simultaneously (CLAMS), to receive image data, LIDAR data, RADAR data, IMU data, GPS data, wheel encoder data, and the like to accurately determine a location of the autonomous vehicle. In some instances, the localization component 720 may provide data to various components of the vehicle 702 to determine an initial position/orientation of an autonomous vehicle for generating a candidate trajectory, as discussed herein.

In some instances, the perception component 722 may include functionality to perform object detection, segmentation, and/or classification. In some instances, the perception component 722 may provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative instances, the perception component 722 may provide processed sensor data that indicates one or more characteristics associated with a detected entity and/or the environment in which the entity is positioned/oriented. In some instances, characteristics associated with an entity may include, but are not limited to, an x-position/orientation (global position/orientation), a y-position/orientation (global position/orientation), a z-position/orientation (global position/orientation), an orientation, an entity type (e.g., a classification), a velocity of the entity, an extent of the entity (size), sensor signal quality and/or other characteristics, an indication of an amount of features present in a signal, a clarity score associated with a sensor signal, etc. Characteristics associated with the environment may include, but are not limited to, a presence of another entity in the environment, a state of another entity in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may be a sequence of waypoints for travelling between two locations. As non-limiting examples, waypoints include streets, intersections, coordinates (e.g., determined by the localization and/or mapping component and/or a GPS), etc. Further, the planning component 724 may generate an instruction for guiding the autonomous vehicle along at least a portion of the route from the first location to the second location. In some instances, the planning component 724 may determine how to guide the autonomous vehicle from a first waypoint in the sequence of waypoints to a second waypoint in the sequence of waypoints. In some instances, the instruction may be a trajectory, or a portion of a trajectory. In some instances, multiple trajectories may be substantially simultaneously generated (e.g., within technical tolerances) in accordance with a receding horizon technique. In some instances, and as discussed herein, the planning component 724 may receive a map and/or position/orientation from the localization component 720.

In some instances, the vehicle computing device 704 may include one or more system controllers 726, which may be configured to control steering, propulsion, braking, safety, emitters, communication, and other systems of the vehicle 702. These system controller(s) 726 may communicate with and/or control corresponding systems of the drive module(s) 714 and/or other components of the vehicle 702.

The memory 718 may further include one or more maps 728 that may be used by the vehicle 702 to navigate within the environment. For the purpose of this discussion, a map may be any number of data features modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In some instances, the map may include an occupancy grid, point map, landmark map, and/or graph of pose constraints. In some instances, the vehicle 702 may be controlled based at least in part on the maps 728. That is, the maps 728 may be used in connection with the localization component 720 (and/or generated by the localization component 720), the perception component 722, and/or the planning component 724 to determine a location of the vehicle 702, identify objects in an environment, and/or generate routes and/or trajectories to navigate within an environment.

In some instances, the one or more maps 728 may be stored on a remote computing device(s) (such as the computing device(s) 736) accessible via network(s) 734. In some instances, multiple maps 728 may be stored based on, for example, a condition, which may include a classification and/or characteristic, as discussed herein.

The parameter(s) 730 may include any number of values and/or instructions for controlling production of the map and/or position/orientation determined by the localization component 720. For example, the parameter(s) 730 may include a type of localization and/or mapping algorithm to use, how much sensor data to accumulate before generating a map and/or position/orientation, a magnitude associated with an uncertainty variable included in a function of the localization and/or mapping component, an identifier of sensor data to rely on and/or exclude from use, a sensor calibration value, an instruction to set a sensor function (e.g., a wavelength of a laser to transmit, a laser/RADAR pulse density, a LIDAR revolution speed, an ISO and/or zoom for taking an image), a vehicle control instruction (e.g., a vehicle speed, a desired lane to be in, a vehicle spacing distance, an instruction to move away from a sensory obstruction), etc.

The parameter adjustment component 732 may be configured to verify that a map and/or position/orientation generated by the localization component 720 meets a score threshold (e.g., an indication that the map and/or position/orientation has a degree of clarity) and/or decreases the score associated with a map and/or position/orientation for a specified condition by adjusting at least one of the parameter(s) 730 of the localization component 720. In some examples, the parameter adjustment component 732 may include specialized hardware for conducting hyperparameter optimization such as, for example, an application-specific integrated circuit (ASIC), a field-programmable gate array (FPGA), graphics processing units, etc.

In some instances, aspects of some or all of the components discussed herein may include any models, algorithms, and/or machine learning algorithms. For example, in some instances, the components in the memory 718 (and the memory 740 and 750, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet70, ResNet101, VGG, DenseNet, PointNet, and the like.

In some instances, the sensor system(s) 706 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the LIDAR sensors may include individual LIDAR sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally or alternatively, the sensor system(s) 706 may send sensor data, via the network(s) 734, to the computing device(s) 736 at a particular frequency, after a lapse of a predetermined period of time, in near real-time, etc.

The vehicle 702 may also include one or more emitters 708 for emitting light and/or sound, as described above. The emitters 708 in this example include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connection(s) 710 that enable communication between the vehicle 702 and one or more other local or remote computing device(s). For instance, the communication connection(s) 710 may facilitate communication with other local computing device(s) on the vehicle 702 and/or the drive module(s) 714. Also, the communication connection(s) 710 may allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 may include physical and/or logical interfaces (a "network interface") for connecting the vehicle computing device 704 to another computing device or a network, such as network(s) 734. For example, the communications connection(s) 710 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some instances, the vehicle 702 may include one or more drive modules 714. In some instances, the vehicle 702 may have a single drive module 714. In some instances, the drive module(s) 714 may include one or more sensor systems to detect conditions of the drive module(s) 714 and/or the surroundings of the vehicle 702. By way of example and not limitation, the sensor system(s) of the drive module(s) 714 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive module(s) 714. In some cases, the sensor system(s) on the drive module(s) 714 may overlap or supplement corresponding systems of the vehicle 702 (e.g., sensor system(s) 706).

The drive module(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 714 may include a drive module controller which may receive and preprocess data from the sensor system(s) and to control operation of the various vehicle systems. In some instances, the drive module controller may include one or more processors and memory communicatively coupled with the one or more processors. The memory may store one or more modules to perform various functionalities of the drive module(s) 714. Furthermore, the drive module(s) 714 may also include one or more communication connection(s) that enable communication by the respective drive module with one or more other local or remote computing device(s).

In some instances, the localization component 720, perception component 722, the planning component 724, the parameter(s) 730, and/or the parameter adjustment component 732 may process sensor data, as described above, and may send their respective outputs, over the one or more network(s) 734, to one or more computing device(s) 736. In some instances, the localization component 720, the perception component 722, the planning component 724, the parameter(s) 730, and/or the parameter adjustment component 732 may send their respective outputs to the one or more computing device(s) 736 at a particular frequency, after a lapse of a predetermined period of time, in near real-time, etc.

In some instances, the vehicle 702 may send sensor data to one or more computing device(s) 736, via the network(s) 734. Computing device(s) 736 may represent computing device(s) 102. In some instances, the vehicle 702 may send raw sensor data to the computing device(s) 736. In other examples, the vehicle 702 may send processed sensor data and/or representations of sensor data to the computing device(s) 736. In some cases, the vehicle 702 may send sensor data (raw or processed) to the computing device(s) 736 and/or the user device(s) 246 as one or more log files.

The computing device(s) 736 may receive the sensor data (raw or processed) to facilitate adjusting parameter(s) 730 to increase a clarity of a map and/or position/orientation generated by the localization component 720, as discussed herein. In some instances, the computing device(s) 736 include processor(s) 738 and memory 740 communicatively coupled with the processor(s) 738. In the illustrated example, the memory 740 of the computing device(s) 736 may store a localization and/or mapping component 742, parameter adjustment component 744, parameter(s) 746, and/or historical sensor data 748. Although it isn't depicted, the vehicle 702 may also store historical sensor data 748 (e.g., sensor data stored in memory 718 or otherwise accessible to the vehicle computing device 704). In some instances, localization and/or mapping component 742, parameter adjustment component 744, parameter(s) 746, and/or historical sensor data 748 may correspond to localization and/or mapping component 106, parameter adjustment component 126, localization and/or mapping parameter(s) 124, and/or historical sensor data 128, respectively.

The processor(s) 716 of the vehicle 702 and/or the processor(s) 738 of the computing device(s) 736 may be any suitable processor capable of executing instructions to process data and perform operations as described herein. By way of example and not limitation, the processor(s) 716 and/or 738 may comprise one or more central processing units (CPUs), graphics processing units (GPUs), integrated circuits (e.g., ASICs, etc.), gate arrays (e.g., FPGAs, etc.), and/or any other device or portion of a device that processes electronic data to transform that electronic data into other electronic data that may be stored in registers and/or memory.

Memory 718 and/or 740 may be examples of non-transitory computer-readable media. The memory 718 and/or 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa. Further, aspects of the localization and/or mapping components and/or the parameter adjustment components may be performed on any of the devices discussed herein.

Example Clauses

A. A system comprising: one or more processors; and one or more computer-readable media storing instructions executable by the one or more processors, wherein the instructions, when executed, cause the system to: receive LIDAR data from a LIDAR sensor of an autonomous vehicle; determine a location of the autonomous vehicle within a map; select, based at least in part on the location, a parameter; and one or more of create or update the map, based at least in part on additional LIDAR data and the parameter, of an environment through which the autonomous vehicle traverses.

B. The system of paragraph A, wherein: the parameter is determined based at least in part on minimizing a score associated with the map; the parameter is associated with operation of a mapping component that generates the map; and selecting the parameter comprises modifying at least one of the LIDAR data, sensor operation, or a component that creates or updates the map.

C. The system of either of paragraphs A or B, wherein modifying includes adjusting at least one of: a sensor data accumulation period; an uncertainty measurement associated with the sensor data; an instruction to discard at least a portion of the sensor data for map generation; a search radius associated with a search for sensor data that corresponds to a same portion of the environment; a firing rate of the LIDAR sensor; a spin speed of the LIDAR sensor; or a frequency of attempted alignments of sensor data from different sensors to make within a distance traversed by the autonomous vehicle.

D. The system of any one of paragraphs A-C, wherein selecting the parameter comprises at least one of: determining, using a lookup table, one or more values associated with the location; determining, based on one or more of an interpolation or extrapolation, the parameter; or modifying, based at least in part on a score associated with the map, a value of the parameter.

E. The system of any one of paragraphs A-D, wherein the instructions further cause the system to control, based at least in part on the map and the location, the autonomous vehicle.

F. The system of any one of paragraphs A-E, wherein the instructions further cause the system to: determine, based at least in part on the LIDAR data, a classification of the environment, and wherein selecting the parameter is further based at least in part on the classification.

G. The system of any one of paragraphs A-F, wherein the classification comprises at least one of: a city; a tunnel; a bridge; a rural area; or a highway.

H. A method comprising: receiving first sensor data from a sensor of a vehicle; determining, based at least in part on the first sensor data, a condition associated with at least one of the sensor or the vehicle; determining, based at least in part on the condition, a parameter; and adjusting, based at least in part on the parameter, operation of at least one of a mapping algorithm or the sensor.

I. The method of paragraph H, further comprising: receiving second sensor data from the sensor; determining, based at least in part on the second sensor data and the adjustment, a map; and controlling the vehicle based at least in part on the map.

J. The method of either paragraph H or I, wherein determining the parameter comprises: receiving, from the sensor, third sensor data; determining, from the third sensor data, the condition; generating, based at least in part on the third sensor data, a map; determining, based at least in part on the map, a score; minimizing the score, based at least in part on modifying the third sensor data, operation of the mapping algorithm, or operation of the sensor; and determining, as the parameter, a state achieved by the modification.

K. The method of any one of paragraphs H-J, wherein the condition comprises at least one of a vehicle speed, a vehicle location, a vehicle orientation, semantic information associated with sensor data, a vehicle sensor quality, an indication of a density of features of an environment surrounding the vehicle, an indication of weather of the environment.

L. The method of any one of paragraphs H-K, further comprising: determining, based at least in part on the sensor data, a classification of the environment; and associating the parameter with the classification.

M. The method of any one of paragraphs H-L, wherein the method further comprises determining, based at least in part on the sensor data, a location of the autonomous vehicle, and wherein the condition comprises the location.

N. The method of any one of paragraphs H-M, wherein the parameter comprises at least one of: a sensor data accumulation period; an uncertainty measurement associated with the sensor data; an instruction to discard at least a portion of the sensor data for map generation; a search radius associated with a search for sensor data that corresponds to a same portion of the environment; a firing rate of the sensor; an intrinsic or extrinsic setting of the sensor; or a frequency of attempted alignments of sensor data from different sensors to make within a distance traversed by the autonomous vehicle.

O. A non-transitory computer-readable medium having a set of instructions that, when executed, cause one or more processors to: receive sensor data from a sensor of an autonomous vehicle; determine, based at least in part on the sensor data, a condition associated with at least one of the sensor or an environment surrounding the autonomous vehicle; adjust, as an adjusted parameter and based at least in part on the condition, a parameter of at least one of a mapping component or the sensor to increase clarity of a map generated by the mapping algorithm; and determine, based at least in part on the sensor data and the adjusted parameter, a map of the environment and a position of the autonomous vehicle in the environment.

P. The non-transitory computer-readable medium of paragraph O, wherein the condition comprises at least one of a characteristic of the sensor data or a classification of the environment.

Q. The non-transitory computer-readable medium of either paragraph O or P, wherein the instructions further cause the one or more processors to control, based at least in part on at least one of the map or the position, operation of the autonomous vehicle.

R. The non-transitory computer-readable medium of any one of paragraphs O-Q, wherein determining the map and the position comprises at least one of: altering, based at least in part on the adjusted parameter, the sensor data to determine altered sensor data; or modifying, based at least in part on the adjusted parameter, operation of the sensor to change output of the sensor.

S. The non-transitory computer-readable medium of any one of paragraphs O-R, wherein the parameter comprises at least one of: a sensor data accumulation period; an uncertainty measurement associated with the sensor data; an instruction to discard at least a portion of the sensor data for map generation; a search radius associated with a search for sensor data that corresponds to a same portion of the environment; a firing rate of the sensor; an intrinsic or extrinsic setting of the sensor; or a frequency of attempted alignments of sensor data from different sensors to make within a distance traversed by the autonomous vehicle.

T. The non-transitory computer-readable medium of any one of paragraphs O-S, wherein the map is a second map and the position is a second position and the instructions further cause the one or more processors to: determine, based at least in part on the sensor data and a default set of parameters, a first map and a first position; determine a score associated with at least one of the first map or the first position; and adjust the default set of parameters to decrease the score associated with the first map, the adjusting comprising determining the first parameter set based at least in part on the characteristic of the sensor data.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing instructions executable by the one or more processors, wherein the instructions, when executed, cause the system to perform operations comprising:
   receiving LIDAR data from a LIDAR sensor of an autonomous vehicle;
   determining a location of the autonomous vehicle within a map based at least in part on the LIDAR data;
   selecting, based at least in part on the location, a parameter associated with a configuration of a mapping component that creates or updates the map based at least in part on the LIDAR data; and
   updating the map, based at least in part on additional LIDAR data and the parameter, of an environment through which the autonomous vehicle traverses.

2. The system of claim 1, wherein:
   the parameter is determined based at least in part on minimizing a score associated with the map; and
   selecting the parameter comprises modifying at least one of the LIDAR data or the mapping component.

3. The system of claim 1, wherein the operations further comprise modifying a sensor parameter based at least in part on the location, wherein modifying the sensor parameter comprises adjusting at least one of:
   a sensor data accumulation period;
   an uncertainty measurement associated with the sensor data;
   an instruction to discard at least a portion of the sensor data for map generation;
   a search radius associated with a search for sensor data that corresponds to a same portion of the environment;
   a firing rate of the LIDAR sensor;
   a spin speed of the LIDAR sensor; or
   a frequency of attempted alignments of sensor data from different sensors to make within a distance traversed by the autonomous vehicle.

4. The system of claim 1, wherein selecting the parameter comprises at least one of:
   determining, using a lookup table, one or more values associated with the location;
   determining, based on one or more of an interpolation or extrapolation, the parameter; or
   modifying, based at least in part on a score associated with the map, a value of the parameter.

5. The system of claim 1, wherein the instructions further cause the system to control, based at least in part on the map and the location, the autonomous vehicle.

6. The system of claim 1, wherein the instructions further cause the system to:
   determine, based at least in part on the LIDAR data, a classification of the environment, and
   wherein selecting the parameter is further based at least in part on the classification.

7. The system of claim 6, wherein the classification comprises at least one of:
   a city;
   a tunnel;
   a bridge;
   a rural area; or
   a highway.

8. A method comprising:
   receiving first sensor data from a sensor of a vehicle;
   determining, based at least in part on the first sensor data, a condition associated with at least one of the vehicle or an environment surrounding the vehicle;
   determining, based at least in part on the condition, a parameter associated with a configuration of a mapping algorithm;
   adjusting, based at least in part on the parameter, operation of the mapping algorithm; and
   updating the map, based at least in part on additional LIDAR data and the parameter.

9. The method of claim 8, further comprising:
   receiving second sensor data from the sensor;
   determining, based at least in part on the second sensor data and the adjustment, a map; and
   controlling the vehicle based at least in part on the map.

10. The method of claim 8, wherein determining the parameter comprises:
    receiving, from the sensor, third sensor data;
    determining, from the third sensor data, the condition;
    generating, based at least in part on the third sensor data, a map;
    determining, based at least in part on the map, a score;
    minimizing the score, based at least in part on modifying the third sensor data, operation of the mapping algorithm, or operation of the sensor; and
    determining, as the parameter, a state achieved by the modification.

11. The method of claim 8, wherein the condition comprises at least one of a vehicle speed, a vehicle location, a vehicle orientation, semantic information associated with sensor data, a vehicle sensor quality, an indication of a density of features of an environment surrounding the vehicle, or an indication of weather of the environment.

12. The method of claim 8, further comprising:
determining, based at least in part on the first sensor data, a classification of the environment; and
associating the parameter with the classification.

13. The method of claim 8,
wherein the method further comprises determining, based at least in part on the sensor data, a location of the autonomous vehicle, and
wherein the condition comprises the location.

14. The method of claim 8, wherein the method further comprises adjusting operation of the sensor based at least in part on the parameter and wherein the parameter comprises at least one of:
a sensor data accumulation period;
an uncertainty measurement associated with the sensor data;
an instruction to discard at least a portion of the sensor data for map generation;
a search radius associated with a search for sensor data that corresponds to a same portion of the environment;
a firing rate of the sensor;
an intrinsic or extrinsic setting of the sensor; or
a frequency of attempted alignments of sensor data from different sensors to make within a distance traversed by the autonomous vehicle.

15. A non-transitory computer-readable medium having a set of instructions that, when executed, cause one or more processors to perform operations comprising:
receiving sensor data from a sensor of an autonomous vehicle;
determining, based at least in part on the sensor data, a condition associated with at least one of the autonomous vehicle or an environment surrounding the autonomous vehicle;
adjusting, as an adjusted parameter and based at least in part on the condition, a parameter of a mapping component to increase clarity of a map generated by the mapping component;
determining, based at least in part on the sensor data and the adjusted parameter, a map of the environment and a position of the autonomous vehicle in the environment; and
updating the map, based at least in part on additional LIDAR data and the adjusted parameter.

16. The non-transitory computer-readable medium of claim 15, wherein the condition comprises at least one of a characteristic of the sensor data or a classification associated with the environment.

17. The non-transitory computer-readable medium of claim 15, wherein the operations further comprise controlling, based at least in part on at least one of the map or the position, operation of the autonomous vehicle.

18. The non-transitory computer-readable medium of claim 15, wherein determining the map and the position comprises at least one of:
altering, based at least in part on the adjusted parameter, the sensor data to determine altered sensor data; or
modifying, based at least in part on the adjusted parameter, operation of the sensor to change output of the sensor.

19. The non-transitory computer-readable medium of claim 15, wherein the parameter comprises at least one of:
a sensor data accumulation period;
an uncertainty measurement associated with the sensor data;
an instruction to discard at least a portion of the sensor data for map generation;
a search radius associated with a search for sensor data that corresponds to a same portion of the environment;
a firing rate of the sensor;
an intrinsic or extrinsic setting of the sensor; or
a frequency of attempted alignments of sensor data from different sensors to make within a distance traversed by the autonomous vehicle.

20. The non-transitory computer-readable medium of claim 15, wherein the map is a second map and the position is a second position and the operations further comprise:
determining, based at least in part on the sensor data and a default set of parameters, a first map and a first position;
determining a score associated with at least one of the first map or the first position; and
adjusting the default set of parameters to decrease the score associated with the first map.

* * * * *